United States Patent [19]

Ho et al.

[11] 4,435,711
[45] Mar. 6, 1984

[54] RADIO TELEPHONE WITH POSITION TRANSMISSION CAPABILITY

[75] Inventors: Cecil C. Ho, Irving; Claude A. Sharpe, Plano; Bruce A. Butcher, Dallas; Alexander G. Bell, Plano, all of Tex.

[73] Assignee: Texas Instruments Incorporated, Dallas, Tex.

[21] Appl. No.: 187,253

[22] Filed: Sep. 15, 1980

[51] Int. Cl.³ ............................................. G01S 1/24
[52] U.S. Cl. .................................. 343/389; 364/452
[58] Field of Search ............ 343/112 R, 103; 340/22, 340/23, 24; 455/88, 89; 364/452

[56] References Cited

U.S. PATENT DOCUMENTS

| | | | |
|---|---|---|---|
| 3,384,891 | 5/1968 | Anderson | 343/103 |
| 3,644,883 | 2/1972 | Borman et al. | 340/23 |
| 3,721,985 | 3/1973 | Perfitt | 343/103 |
| 3,771,483 | 11/1973 | Bond | 364/452 |
| 4,112,421 | 9/1978 | Freeny, Jr. | 343/112 D |
| 4,161,730 | 7/1979 | Anderson | 343/112 R |
| 4,191,958 | 3/1980 | Hulland et al. | 343/112 R |
| 4,197,538 | 4/1980 | Stocker | 343/112 CA |

*Primary Examiner*—Theodore M. Blum
*Attorney, Agent, or Firm*—Alva H. Bandy; Melvin Sharp; N. Rhys Merrett

[57] ABSTRACT

A communications link having a position capability responsive to either a manual or remote control actuation. In one embodiment, a remote carrier has a navigation system for outputting signals representative of the carrier location or position. A frequency shift key (FSK) modulator is connected to the navigation system for tone coding the carrier position signals, a transmitter of a transceiver is connected to the modulator for transmitting the carrier position signals, and a position enable switch for controlling selectively the transmittal of the carrier position signals. In another embodiment, a base station is provided with a control station identification signal (ID) generator, an FSK modulator for tone modulating the station identification signal, and a transmitter connected to the FSK modulator for transmitting the tone modulated carrier ID signal, and a remote station is provided with a receiver mounted upon the carrier for receiving the ID signal, said receiver having a demodulator for demodulating the received carrier identification signals, means for recognizing the ID signal, enabling means for enabling a transmitter, a navigation system outputting position information, an FSK modulator connected to the navigation system for tone modulating the carrier position information, a transmitter for transmitting the position information, and in the base carrier a printer having an FSK demodulator connected to the receiver for demodulating and printing the carrier position information.

4 Claims, 40 Drawing Figures

RADIO TELEPHONE WITH POSITION TRANSMISSION CAPABILITY

This invention relates to radio telephone systems and more particularly to a VHF communications link.

In the past, VHF communication links have not included transceivers having direct connections to navigation systems whereby carrier location information can be transmitted to a communications center either in response to carrier operator activation or base operator activation. Thus, in case of emergency the carrier radioman has had to remain at his post transmitting his location during the emergency, and in the case of the base operator wanting to know the identity or location of a particular carrier, the base operator has had to contact the carrier operator for his identification or location. The disadvantages of the prior art are that in the first situation the radioman has had to remain at his station, during the emergency, broadcasting his location, and in the second situation, the base operator cannot identify unknown carriers or obtain a carrier's location without contacting the carrier's radioman.

Accordingly, it is an object of this invention to provide an improved VHF communications link with position transmission capability.

Another object of the invention is to provide a VHF transceiver which when once actuated can transmit one or more times carrier position information.

A further object of the invention is to provide a VHF transceiver which can be actuated at the carrier (locally) to transmit one or more times carrier position information.

Still another object of the invention is to provide a communications link between a carrier and a base station whereby the base station can actuate the carrier's transceiver to receive position information.

Yet another object of the invention is to provide a VHF communications link which is highly reliable, economical to manufacture, and easy to operate.

Briefly stated the VHF communications link, in one embodiment, comprises a remote station which has a navigation system for determining and outputting carrier position information, a VHF transmitter connected to the navigation system for transmitting the carrier position information, and a position enable switch for enabling the transmitter to transmit the carrier position information. In a second embodiment, the VHF communications link comprises a base station having a polling generator for providing a preselected carrier identification code. A transmitter connected to the polling generator transmitting the carrier identification signal to a remote station transceiver, a remote station receiver for receiving the carrier identification signal, a comparator connected to the carrier's receiver for comparing the identification signal to its identification signal and if identical providing an enable signal, a transmitter connected to the comparator output, a navigation system connected to the transmitter for providing position output information, said transmitter operative in response to the comparator output signal for transmitting the carrier position information to the base station, a receiver at the base station for receiving the carrier position information and a printer connected to the base station receiver for printing the carrier position information.

Other objects and features of the invention will become more readily apparent from the following detailed description when read in conjunction with the accompanying drawings, in which like reference numerals designate like parts throughout the Figures in which.

Figure 1A:
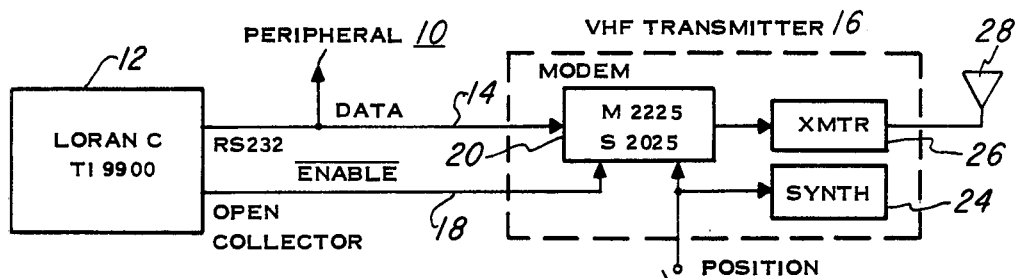
FIG. 1a is a block diagram of the communication data link constituting a first embodiment of the invention.

Referring now to FIG. 1a, the frequency shift key link 10 in its first embodiment, is used to transmit position information from a Loran C navigation system base station via a VHF data link. Position information is determined by a Loran C navigator 12, which may be that described in U.S. Pat. No. 4,134,117 issued Jan. 9, 1979 to E. A. Robinson et al for a "Loran C Receiver." The position data is provided on an RS-232 bus 14 to a VHF transmitter 16. An $\overline{\text{ENABLE}}$ line 18, which is an active low for the duration of the position line, is provided between the Loran C 12 and the transmitter 16. The format for the Loran C data (FIG. 1b) is as follows: The data rate is 300 baud of 30 characters per second; the method is synchronous, serial by bit and serial by character, the code is USASC II 7 level; the character is 10 bits including parity, start and stop; parity is odd; message frequency is continuous; the output is on the RS-232 interface; mark is $-3$ volts and space is $+3$ volts; and the data field is position $-187$ characters, 6.23 seconds and display is 227 characters, 7.57 seconds. A mark exists on the data line 14 for a minimum of 30 ms before and 30 ms after the enable line 18 goes low signifying position data is available.

The VHF transmitter 16 (FIG. 1a) comprises a modem 20, a position enable switch 22, a frequency synthesizer 24 and transmitter 26. The modem 20 (Modulator/Demodulator) when enabled by the closing of enable switch 22 modulates the RS-232 position words with a carrier frequency from frequency synthesizer 24 to provide digitized frequency shift keying tones having two distinct frequencies. The frequencies are, for example, 2225 Hz for a mark and 2025 Hz for a space. The modulated signals are coupled to an antenna 28 for transmission to the base station.

The base station (FIG. 2a) is equipped with a receiver 50 connected through a demodulator 52 to a printer 54 having a baud rate equal to that of the transmittal position data, which, in our example, is 300 baud. A suitable printer is one of TI model 743/800 type printers. These printers come with a demodulator 52 for demodulating the incoming position data tone signals for printing.

In normal operations, this data communications link is used for voice communication purposes and base station printing is inhibited. When used as a data link, voice communications are inhibited until completion of a data transmission from the remote station.

The data transmission mode of the system is enabled by an operator closing the position enable switch 22 (FIG. 1a) for either a single shot or a continuous type operation.

For single shot mode operation the remote operator initiates data transmission by momentarily closing "Position Enable" switch 22 on remote equipment. The remote equipment immediately responds by transmitting a mark (2225 Hz) tone on a selected channel frequency for two seconds. The transmitter then unkeys. At the start of the next Display Data field, the remote transmitter keys a mark tone until position data is present on the data bus 14. When position data is available, the $\overline{\text{ENABLE}}$ line 18 falls. This gates the Loran C 12 data into the transmitter tone modulator 20. The position data stream is transmitted by the remote unit. Upon completion of the position data stream, the remote equipment resets into the voice communication mode.

Figure 1B:
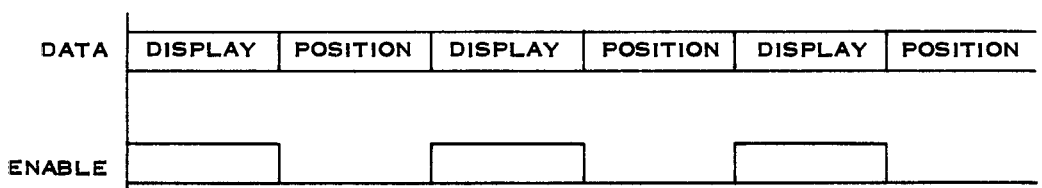
FIG. 1b is a time diagram for the first embodiment of the invention.

For continuous mode operation, the remote operator initiates data transmission by permanently closing "Position Enable" switch 22. The remote equipment immediately responds by transmitting a two second mark (2225 Hz) tone on selected channel frequency or on channel number 16 (emergency channel). At the start of the next Display Data field (FIG. 1b), the remote transmitter keys a mark tone until position data is present on the data bus. When position data is available, the $\overline{\text{ENABLE}}$ line falls. This gates the binary data into the transmitter tone modulator 20. The position data stream is transmitted by the remote unit. Upon completion of the position data stream, which takes about six seconds, a mark tone is sent during the interval (about 8 seconds) that the display data is present on the bus. As shown in FIG. 1b, the remote equipment sends a selected number of complete position transmissions, each of six seconds duration, while the $\overline{\text{ENABLE}}$ line is low, separated by mark tones, each of eight seconds duration while the enable line is high. Then the remote equipment unkeys for eight periods of position/display data; which is for 8×14 seconds or 112 seconds. Position data and mark tones alternating with unkey periods are sent continuously until either one position transmission after the "Position Enable" switch is opened or the system is reset by a power off/on. It will be appreciated by those skilled in the art that the first two second tone is to enable the communications link and at the start of the next Display Data field, the remote transmitter keys a mark tone until position data is present on the data bus. This is to sychronize the link to transmit and receive the position data stream.

Figure 2A:
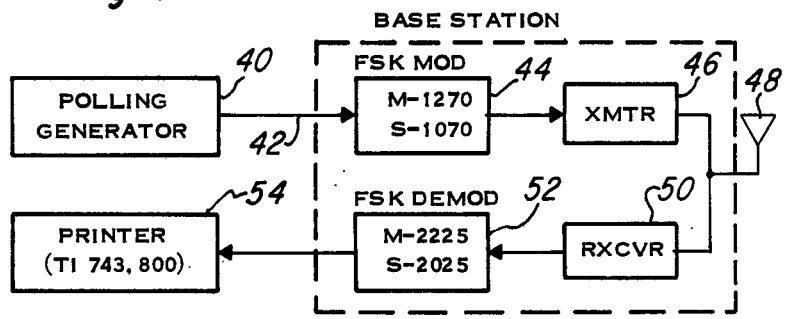
FIG. 2a is a block diagram of the communications data link's remote station constituting a second embodiment of the invention.
Figure 2B:
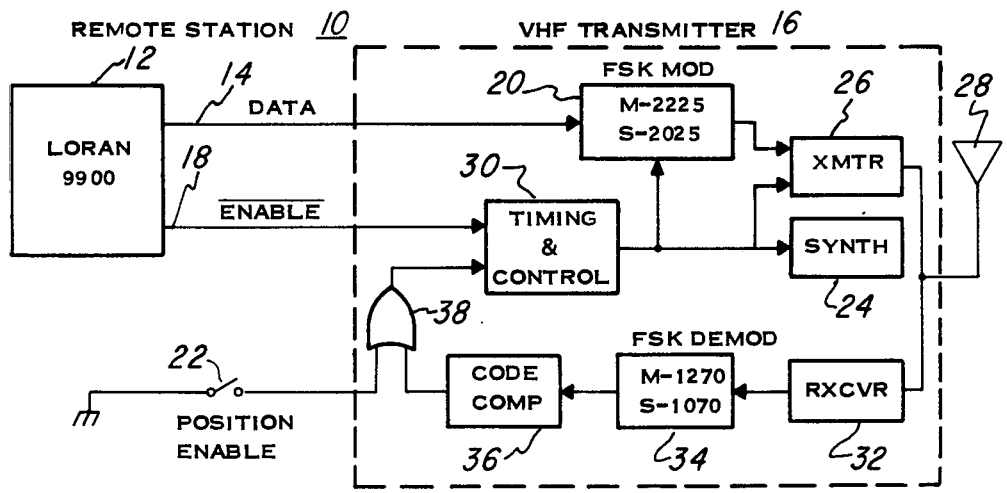
FIG. 2b is a block diagram of the communications data link's base station for the second embodiment of the invention.

In the second embodiment which is shown in FIGS. 2a-2b, the remote station 10 (FIG. 2b) comprises the Loran C receiver 12, RS-232 data bus 14 and $\overline{\text{ENABLE}}$ line 18, connected to the VHF transmitter 16. The VHF transmitter includes a frequency shift keying (FSK) modulator 20 having its modulation input connected to the RS-232 data bus 14. A timing and control circuit 30 has its output connected to the synthesizer 24, transmitter 26 and the FSK modulator 20. The transmitter 26 is also connected to the FSK modulator 20. The output of the transmitter is to antenna 28.

The antenna 28 also receives incoming polling signals for a receiver 32. The receiver 32 has its output connected to a FSK demodulator 34 for demodulating tone signals having a mark frequency of 1270 Hz and a space frequency of 1070 Hz. A comparator 36 compares the demodulated incoming code signal to the remote station's identification code and if they compare an enable pulse is provided to OR gate 38. OR gate 38 is also connected to enabling switch 22. The timing and control circuit 30 is connected to the output of OR gate 38. Thus, the timing and control circuit is controlled by either the position enable switch 22 or the receiver polling circuit comparator 36 output. When enabled by the polled enable signal, the data transmission mode is activated by one position report sequence.

The base station (FIG. 2a) comprises a polling or identification (ID) generator 40 for providing a digitally coded ID signal on data line 42 to frequency shift keying modulator 44. FSK modulator 44 produces a mark tone and a space tone at two distinct frequencies. The mark tone frequency is, for example, 1270 Hz, and the space tone frequency is, for example, 1070 Hz. Transmitter 46 receives the tone signals and transmits them over antenna 48 to the remote station. The selected remote station recognizes the call and transmits its position data back to the base station antenna 48. Antenna 48 is also connected through a transmit/receive switch (not shown) to receiver 50. The receiver 50 is connected to the demodulator 52, which as previously stated, is included as a part of printer 54.

The above embodiments are suitable for incorporation into marine type radio telephones and Loran C systems. A suitable marine radio is that disclosed in U.S. Pat. No. 4,186,342 issued Jan. 29, 1980 to Robert R. Kyle for a "Marine Radio Telephone." The marine radio or transceiver is operated and controlled via the front panel switches and microphone push-to-talk (PTT) switch. Interface between these controls and the transmitter, receiver and synthesizer is provided by digital logic circuits hereinafter described.

Referring now to FIGS. 3a-3e in which is shown the interconnect wiring diagram for the remote station. The wiring diagram is that of the Texas Instruments Incorporated TI-2500 VHF Radio Telephone modified to include the communications link. A control and display printed wiring board (PWB) 56 (FIGS. 3a-3b) is included for panel controls and display.

For panel controls, the control and display PWB 56 has terminals as follows: terminal 58 (FIG. 3a) connected to the contact of a power on/off, volume control switch 60 having its pole connected through lead 61 to the 13.8 V terminal 62 of the digital control board 64 (FIGS. 3c and 3d); a high volume terminal 66, volume control terminal 68, and volume control return terminal 70 connected to the power on/off, volume control swtich 60; a squelch voltage terminal 72, squelch terminal 74 and squelch control return terminal 76 connected to the squelch control switch 78; terminals 80–86 (FIG. 3b) for a six pole public address (PA)/1 watt(W)/25 W switch 90; and terminals 92 and 94 connected to a channel 1/channel 2 select switch 96.

In addition, the front panel PWB 56 has terminals connected to a push-to-talk switch 98, microphone 100 and a microphone hook switch 102 as follows: a microphone high terminal 104, microphone return terminal 106, a shield terminal 108, N.O. PTT terminal 110, a microphone hook terminal 112 and return terminal 114. The microphone hook terminal is provided for handset operation.

Further, the front panel PWB has specialty terminals 116–120 as follows: a handset cradle terminal 116, PA speaker terminal 118, and speaker out terminal 120.

The front panel PWB 56 also has a receiver audio terminal 122, an audio in terminal 124 (FIG. 3a), a 180 V input terminal 126 and ground terminal 128. The display includes a pair of gaseous discharge type display elements. The display elements are seven segment displays with decimal points.

Figure 3A:
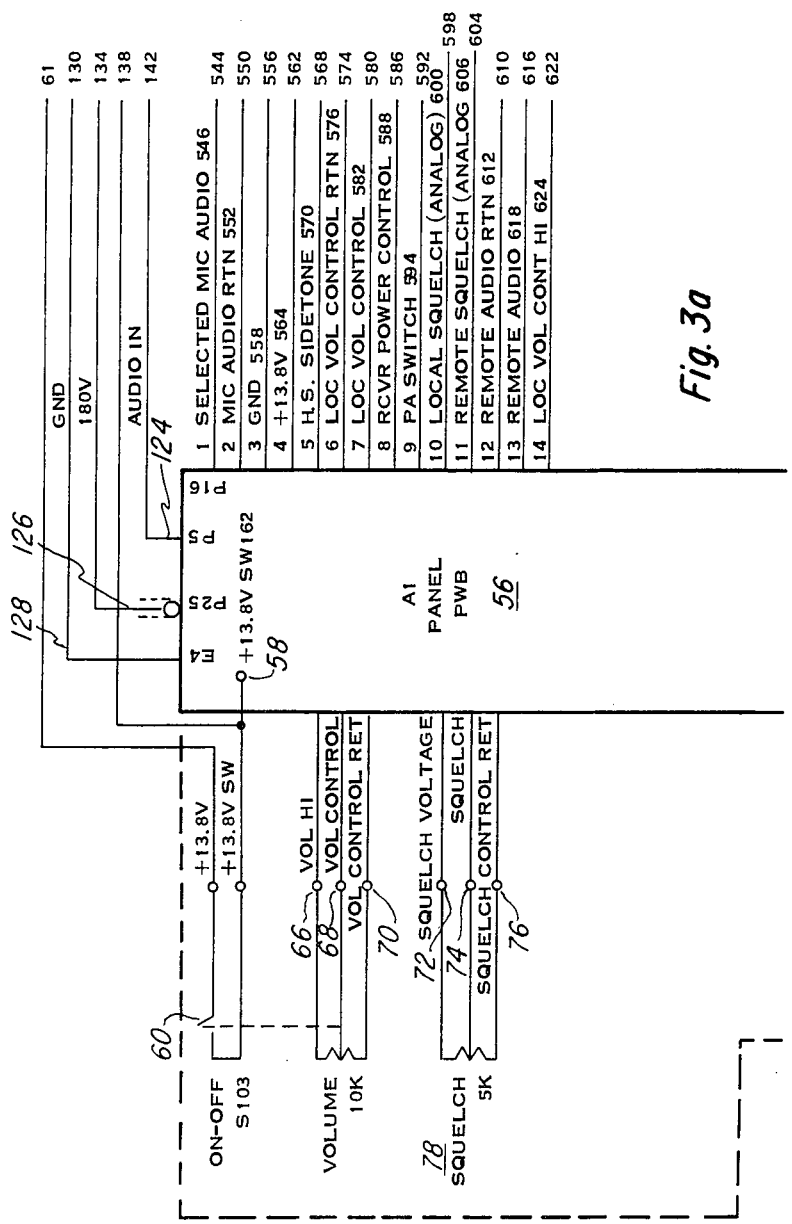
FIGS. 3a–3e are wiring diagrams for the communications data link remote station.
Figure 3B:
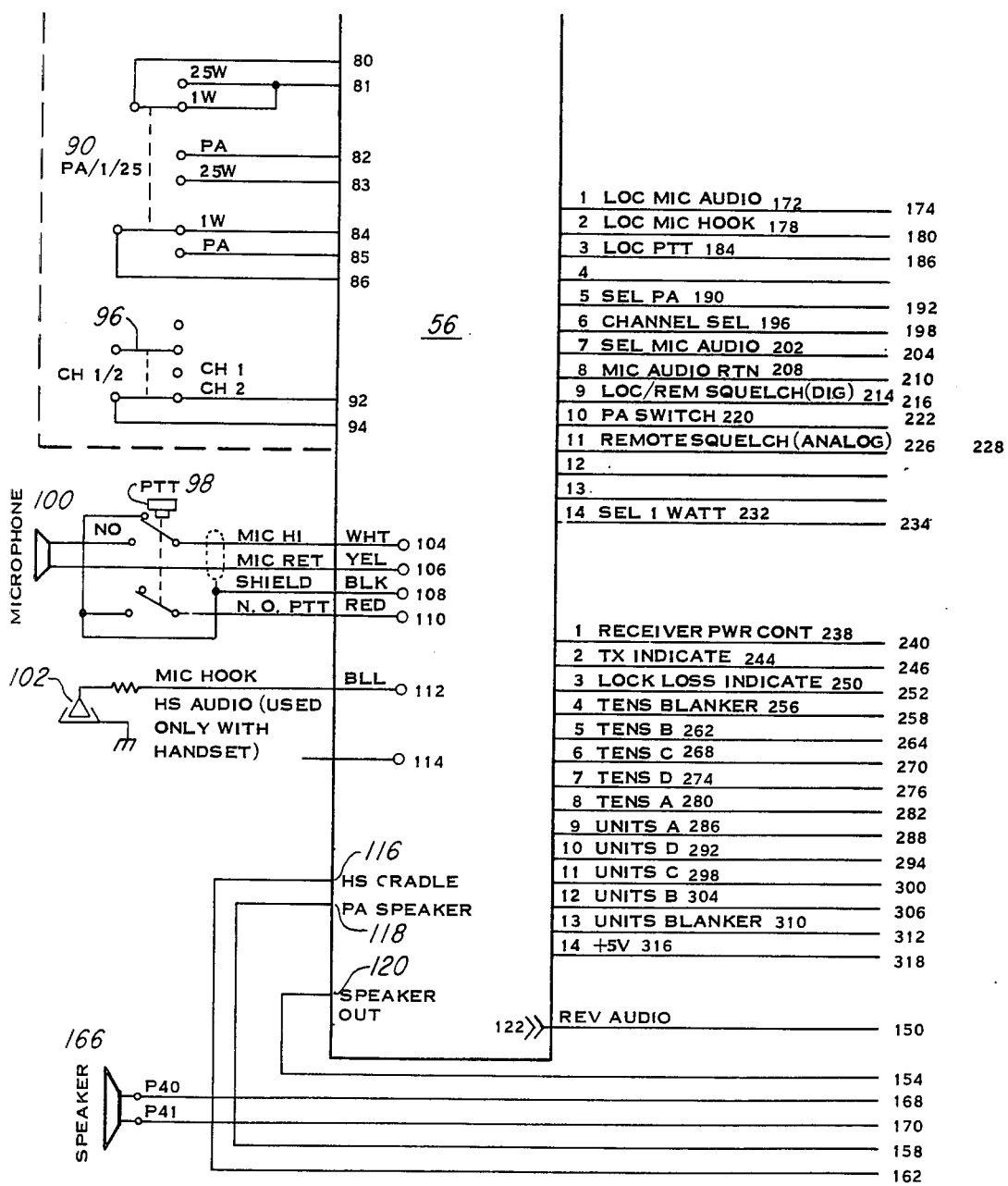
Figure 3C:
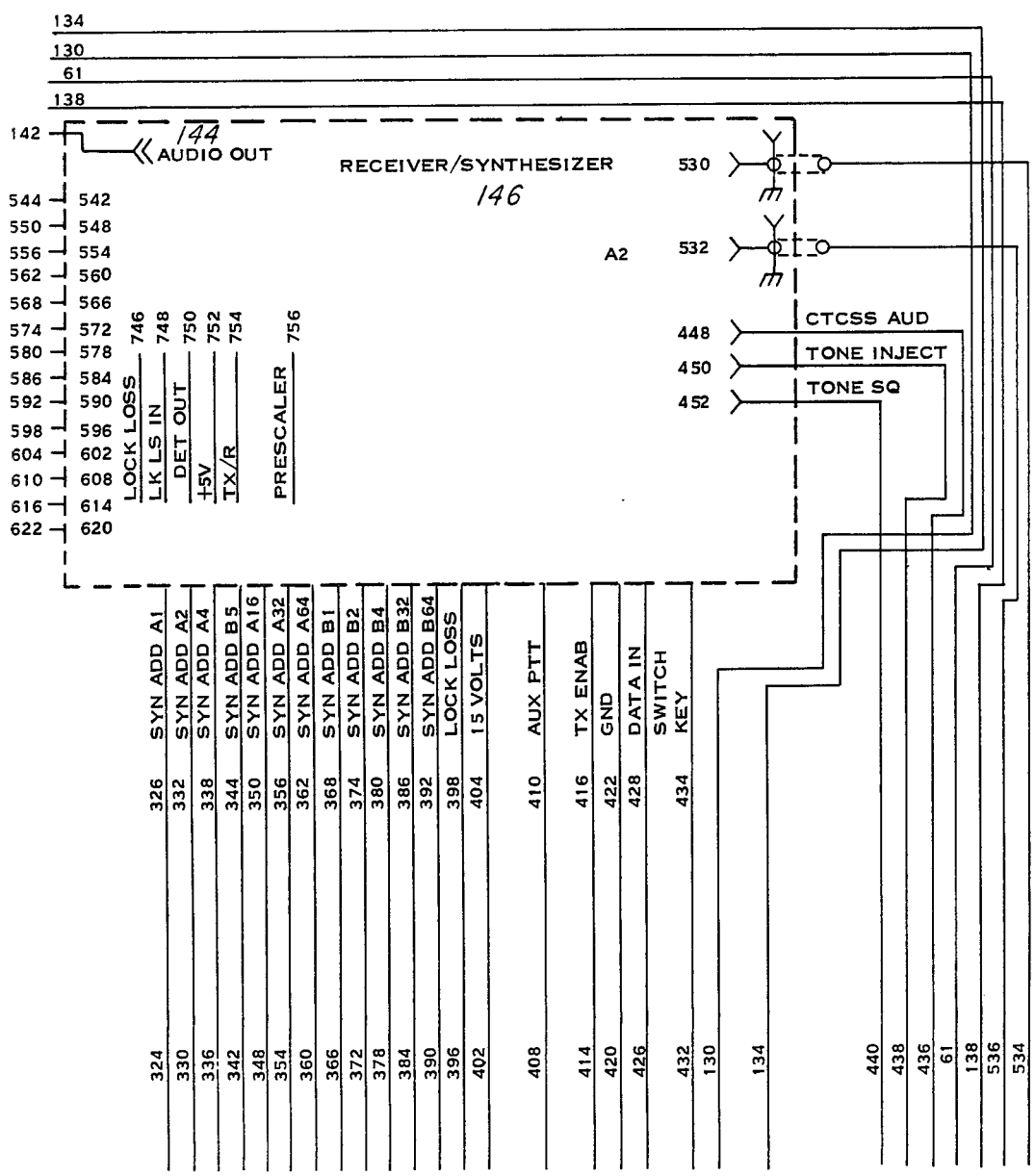
Figure 3D:
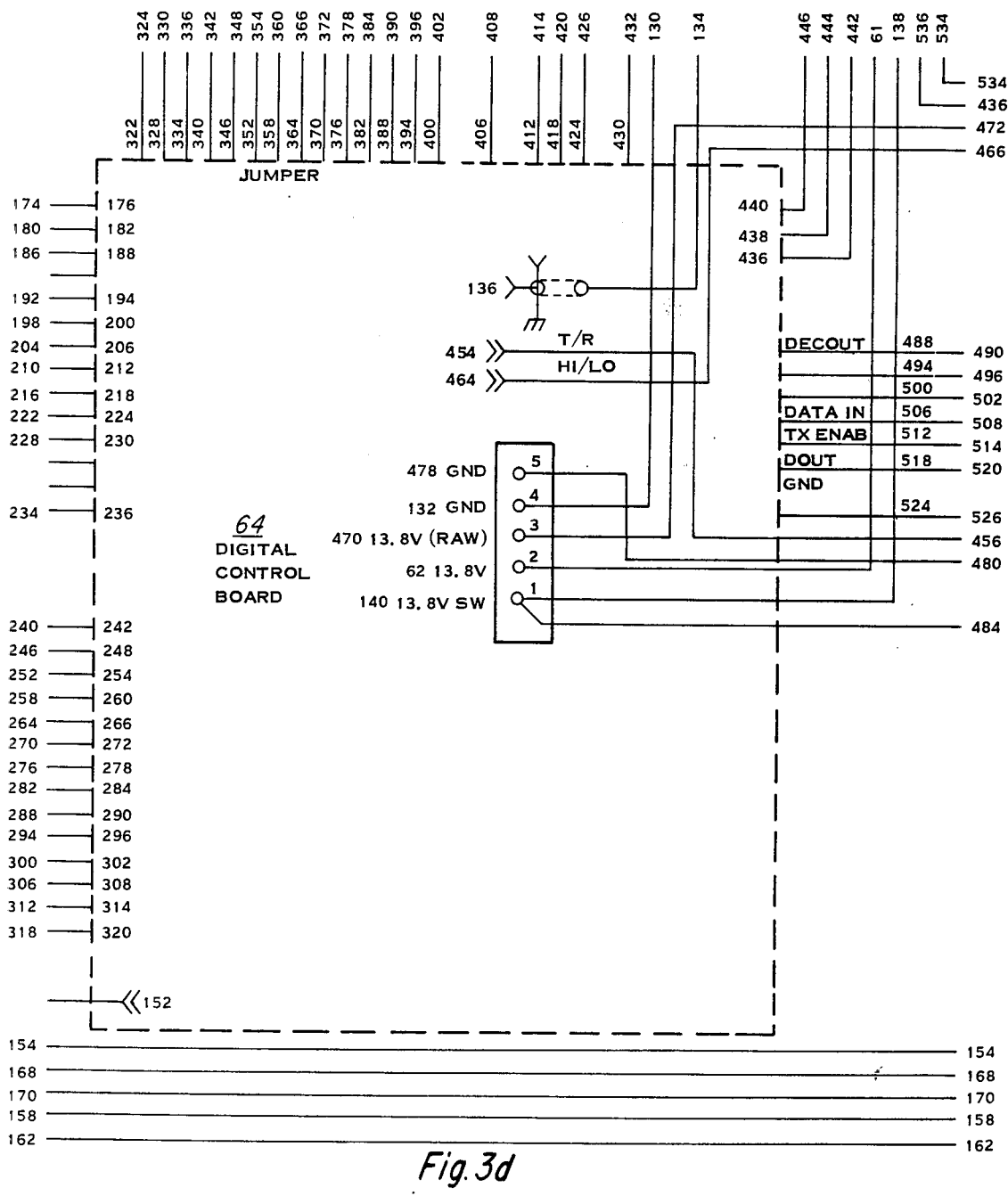

The front panel PWB ground terminal 128 (FIG. 3a) is connected by lead 130 to ground terminal 132 of the digital control board 64 (FIGS. 3c–3d); the 180 V power terminal 126 (FIG. 3a) is connected by lead 134 to terminal 136 of the digital control board 64; the 13.8 V SW terminal 58 is connected by lead 138 to the 13.8 V terminal 140 of the digital control board PWB 68; and the audio in terminal 124 is connected by lead 142 to the audio out terminal 144 of the Receiver/Synthesizer board 146 (FIG. 3d). The receiver audio terminal 122 (FIG. 3b) is connected by lead 150 to terminal 152 of the digital control board 64 (FIG. 3c). The speaker out terminal 120 is connected by lead 154 (FIGS. 3b, 3c, and 3e) to external speaker terminal (jack) 156, the PA speaker terminal 118 is connected by lead 158 to PA speaker jack 160, and handset cradle terminal 116 is connected by lead 162 to handset cradle jack 164. A speaker 166 is carried by the front panel board 56; it is connected by leads 168 and 170 to the external speaker jack 156.

The front panel board 56 (FIG. 3b) has a plurality of function terminals and control terminals connecting the front panel board 56 to the digital control board 134 (FIG. 3c). These terminals are as follows: local microphone audio terminal 172 connected by lead 174 to terminal 176; local microphone hook terminal 178 connected by lead 182 to terminal 180; local PTT terminal 184 connected by lead 186 to terminal 188, select PA terminal 190 connected by lead 192 to terminal 194; channel select terminal 196 connected by lead 198 to terminal 200; select microphone audio 202 connected by lead 204 to terminal 206; microphone audio return terminal 208 connected by lead 210 to terminal 212; local/remote squelch terminal 214 connected by lead 216 to terminal 218; PA switch terminal 220 connected by lead 222 to terminal 224; remote squelch terminal 226 connected by lead 228 to terminal 230; and select one watt terminal 232 connected by lead 234 to terminal 236.

The display terminals of the front panel board (FIG. 3b), connected to the digital control board are (FIG. 3c): receiver power control 238 connected by lead 240 to digital control board terminal 242, transmit indicate terminal 244 connected by lead 246 to terminal 248, lock loss indicate terminal 250 connected by lead 252 to terminal 254, tens blanker terminal 256 connected by lead 258 to terminal 260, tens B terminal 262 connected by lead 264 to 266, tens C terminal 268 connected by lead 270 to terminal 272, tens D terminal 274 connected by lead 276 to terminal 278, tens A terminal 280 connected by lead 282 to terminal 284, units A terminal 286 connected by lead 288 to terminal 290, units D terminal 292 connected by lead 294 to terminal 296, units C terminal 298 connected by lead 300 to terminal 302, units B terminal 304 connected by lead 306 to terminal 308, units blanker terminal 310 connected by lead 312 to terminal 314, and +5 V terminal 316 connected by lead 318 to terminal 320.

The digital control board 64 (FIG. 3c) has output terminals connected to the Receiver/Synthesizer PWB 146 (FIG. 3c) as follows: synthesizer address terminal 322 connected by lead 324 to Receiver/Synthesizer PWB 146 terminal 326, synthesizer address terminal 328 connected by lead 330 to terminal 332, synthesizer address terminal 334 connected by 336 to terminal 338, synthesizer address terminal 340 connected by lead 342 to terminal 344, synthesizer address terminal 346 connected by lead 348 to terminal 350, synthesizer address terminal 352 connected by lead 354 to terminal 356, synthesizer address terminal 358 connected by lead 360 to terminal 362, synthesizer address terminal 364 connected by lead 366 to terminal 368, synthesizer address terminal 370 connected by lead 372 to terminal 374, synthesizer address terminal 376 connected by lead 378 to terminal 380, synthesizer address terminal 382 connected by lead 384 to terminal 386, synthesizer address terminal 388 connected by lead 390 to terminal 392, lock loss terminal 394 connected by lead 396 to terminal 398 and 5 V terminal 400 connected by lead 402 to terminal 404.

To accommodate the communications link the digital control board (FIG. 3d) has output terminals connected to the Receiver/Synthesizer board 146 (FIG. 3d) as follows: an auxillary PTT terminal 406 connected by line 408 to terminal 410, transmit enable terminal 412 connected by line 414 to terminal 416, ground terminal 418 connected by lead 420 to terminal 422, data in terminal 424 connected by lead 426 to terminal 428, and position enable switch terminal 430 connected by lead 432 to terminal 434.

The digital control board (FIG. 3d) also has a CTCSS audio terminal 436, a tone injected terminal 438, and a tone squelch terminal 440 connected, respectively through leads 442, 444 and 446 to Receiver/Synthesizer terminal 448, 450, and 452.

Figure 3E:
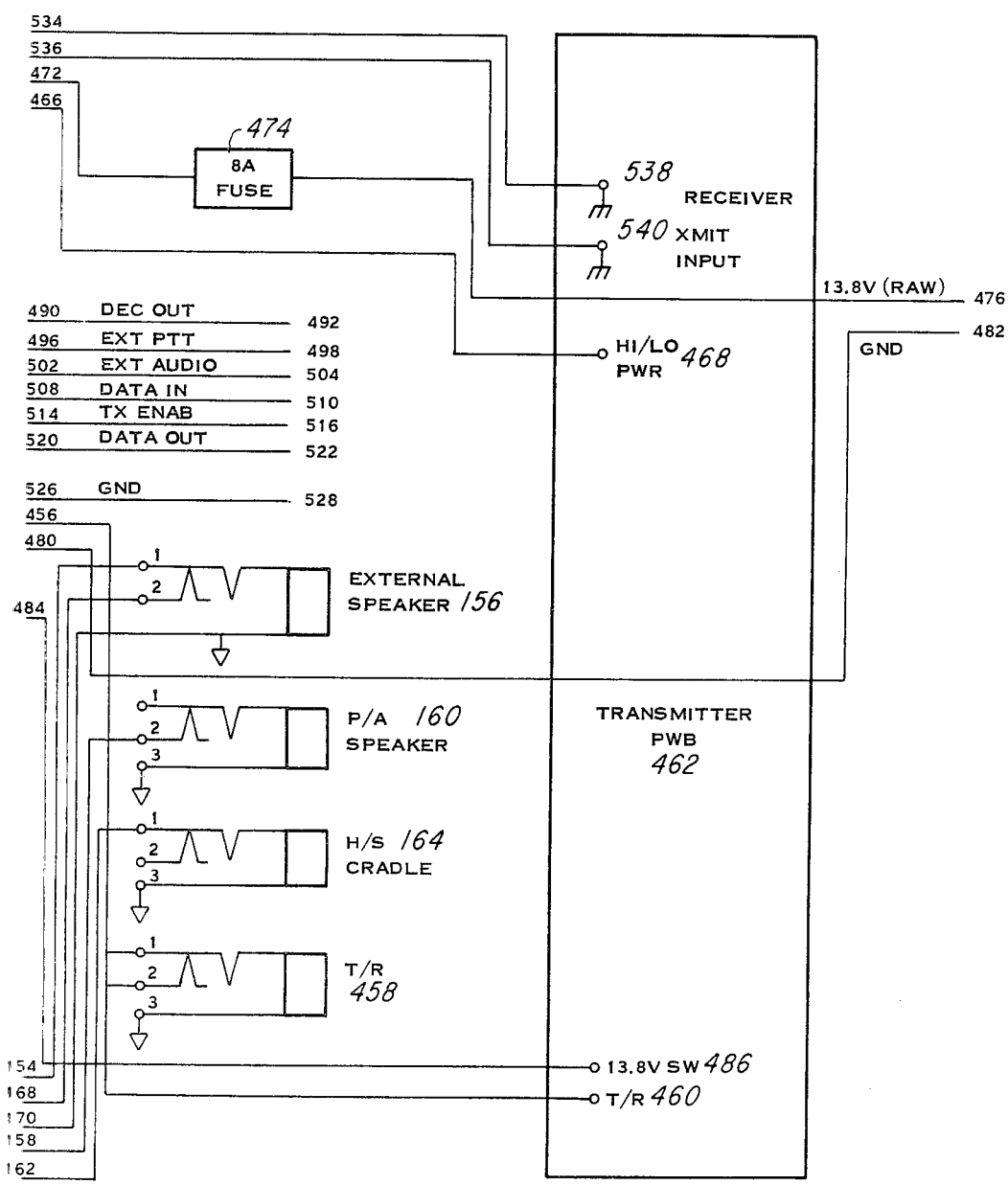

The digital control board (FIG. 3d), in addition, has: a transmit/receive terminal 454 connected by lead 456 to a T/R jack 458 (FIG. 3e) and to a T/R terminal 460 on the transmitter PWB 462; a high/low terminal 464 connected by lead 466 to a high/low terminal 468 on the transmitter PWB 462; a 13.8 V terminal 470 connected by lead 472 through a fuse 474 to a 13.8 V (PRW) terminal 476; and a ground terminal 478 connected by lead 480 to ground terminal 482 (FIG. 3e). The digital control board 13.8 V (SW) terminal 140 is connected by lead 484 to the 13.8 V (SW) terminal 486 of the transmitter PWB 462.

Finally, the digital control board 64 (FIG. 3d) has: terminals connected to accessory "plug ins" or jacks (FIG. 3e) as follows: A DEC out terminal 488 by lead 490 to jack 492; external PTT terminal 494 connected by lead 496 to jack 498, external audio terminal 500 connected by lead 502 to terminal 504, data in terminal 506 connected by lead 508 to jack 510, transmit enable terminal 512 connected by lead 514 to terminal 516, data out terminal 518 connected by lead 520 to terminal 522 and ground terminal 524 connected by lead 526 to terminal 528.

The Receiver/Synthesizer (FIG. 3d) has receiver terminal 530 and transmit input terminal 532 connected, respectively, by leads 534 and 536 to terminals 538 and 540 of the transmitter 462 (FIG. 3e).

Furhter, the Receiver/Synthesizer 146, (FIG. 3c) receives control signals from the front panel Board 56 (FIG. 3a) through terminals as follows: selected microphone audio terminal 542 connected by lead 544 to terminal 546, microphone audio return terminal 548 connected by lead 550 to terminal 552, ground terminal 554 connected by lead 556 to terminal 558, 13.8 V terminal 560 connected by lead 562 to terminal 564, handset sidetone terminal 566 connected by lead 568 to terminal 570, local volume control return terminal 572 connected by lead 574 to terminal 576, local volume control terminal 578 connected by lead 580 to terminal 582, receiver power control 584 connected by lead 586 to terminal 588, PA switch terminal 590 connected by lead 592 to terminal 594, local squelch terminal 596 connected by lead 598 to terminal 600, remote squelch terminal 602 connected by lead 604 to terminal 606, remote audio return 608 connected by lead 610 to terminal 612, remote audio terminal 614 connected by lead 616 to terminal 618, and local volume control terminal 620 connected by lead 622 to terminal 624.

Figure 4A:
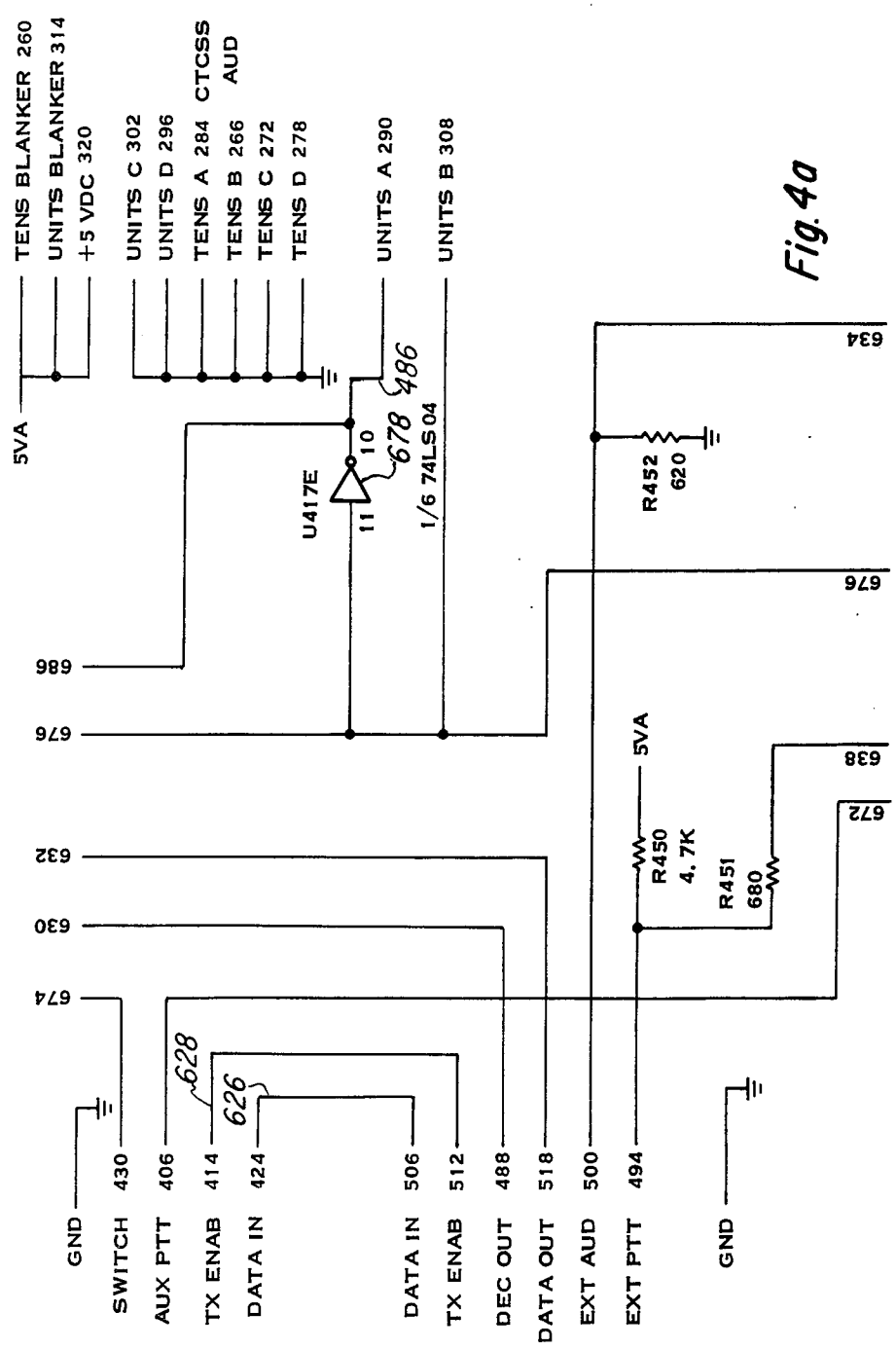
FIGS. 4a–4e are schematic diagrams for the digital control board for the remote station.
Figure 4B:
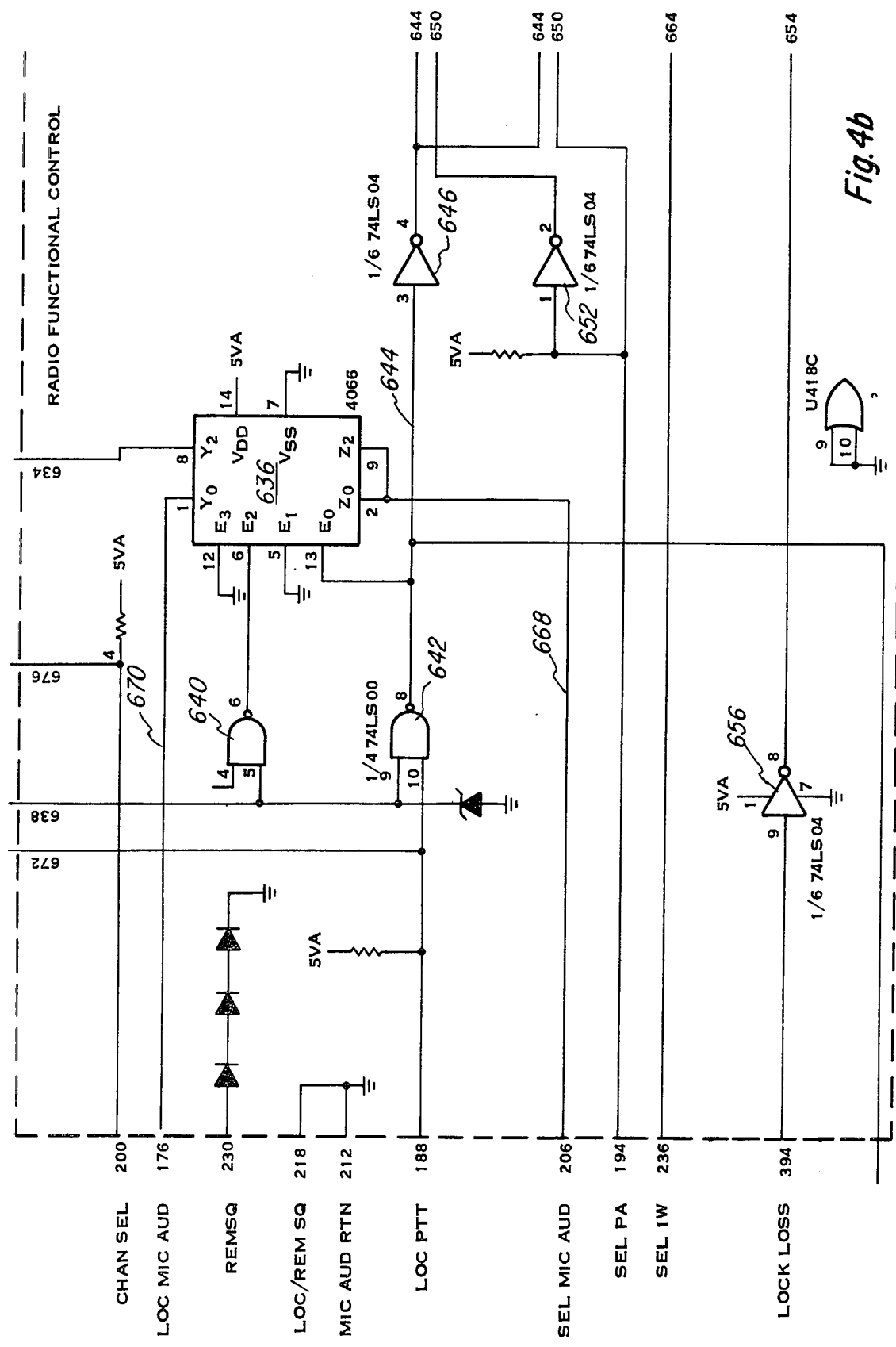
Figure 4C:
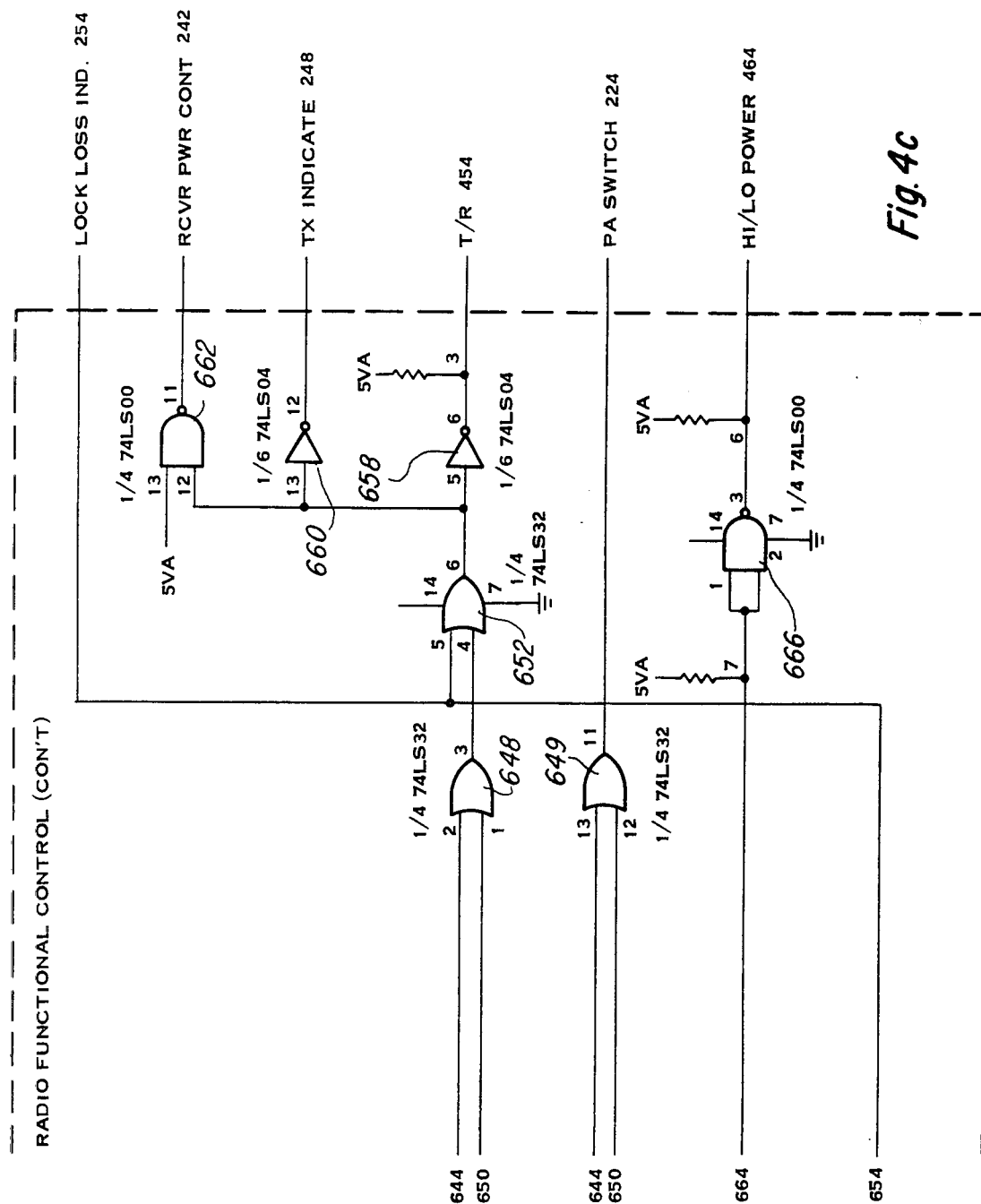
Figure 4D:
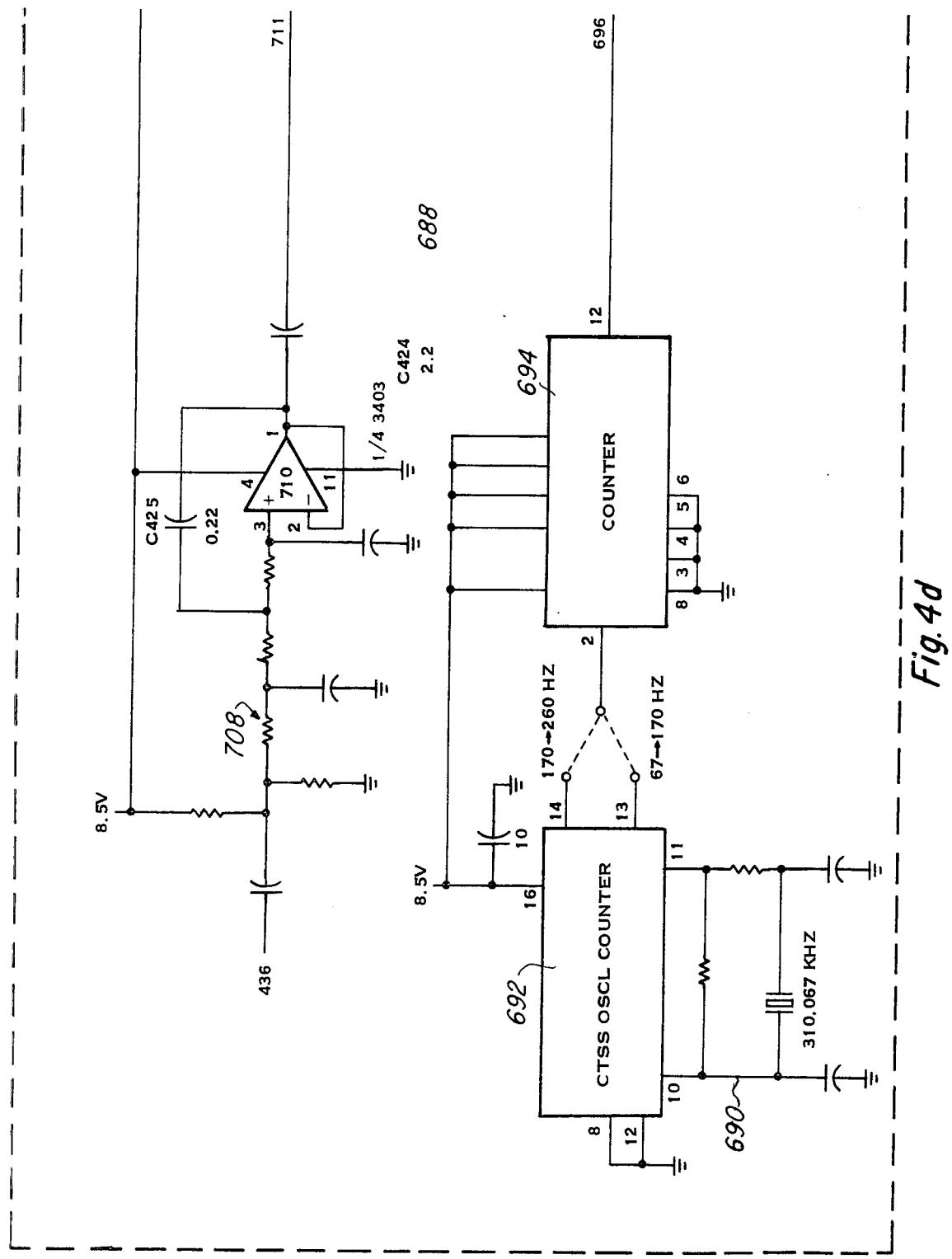
Figure 4E:
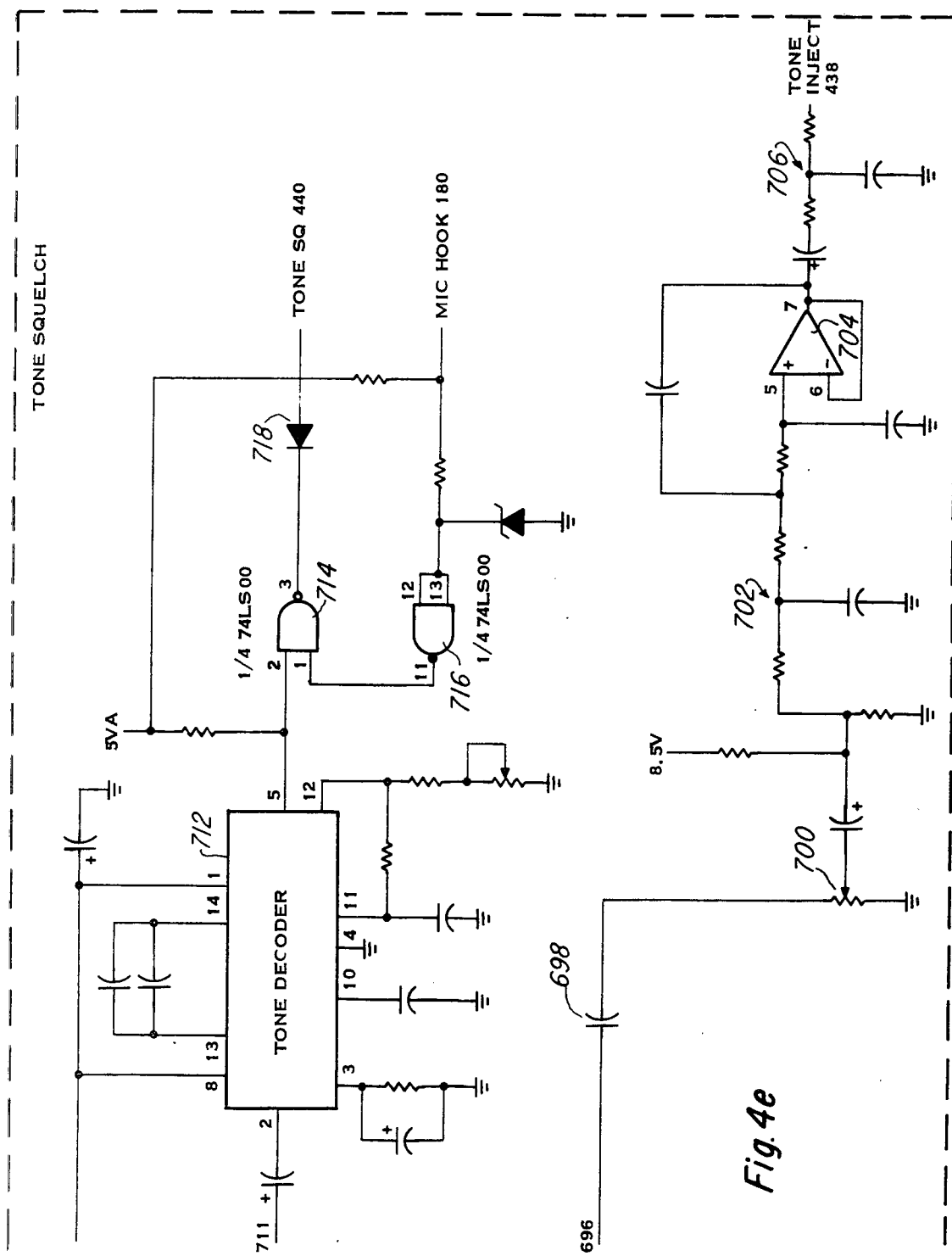
Figure 6A:
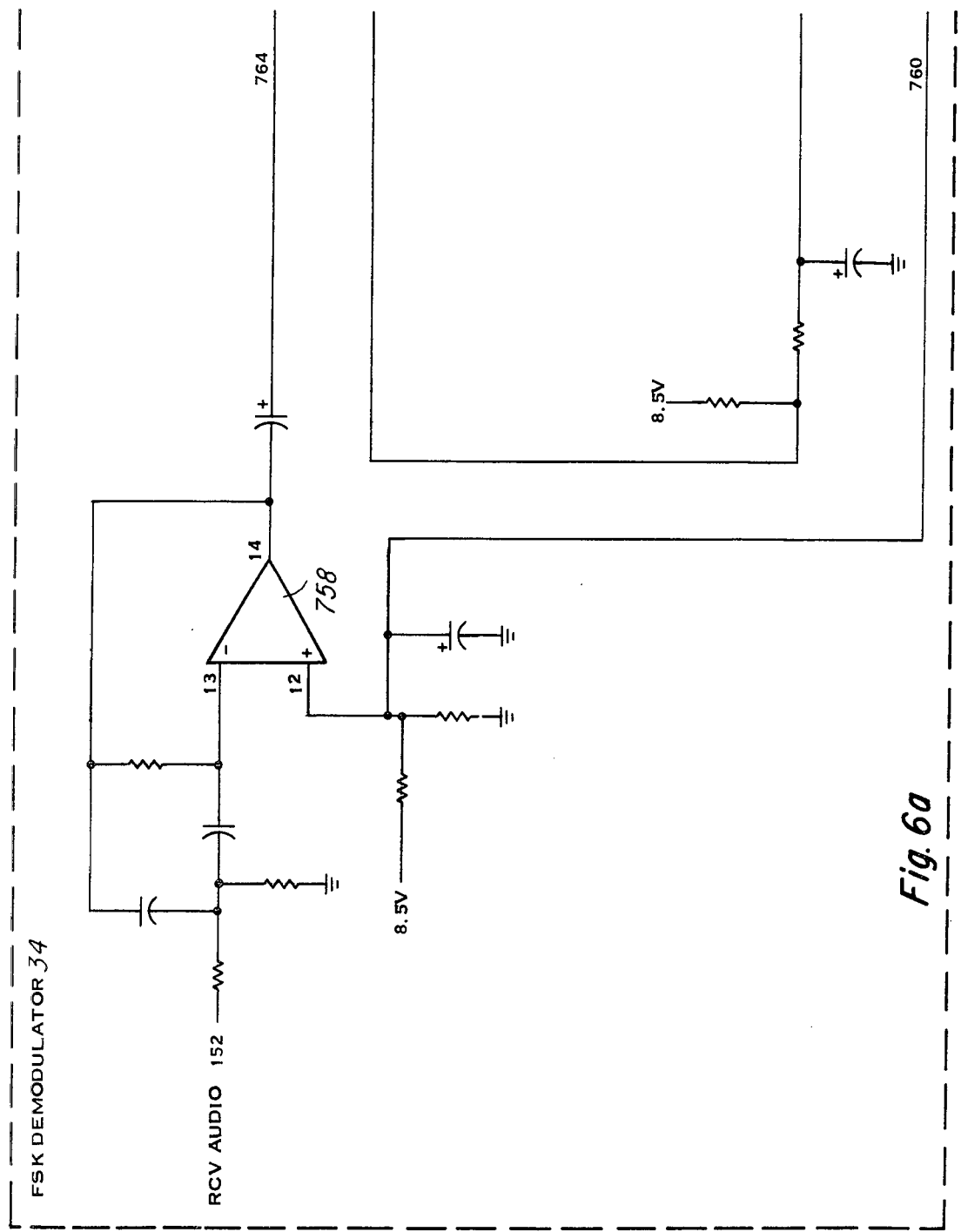
FIGS. 6a–6b are schematic diagrams for the frequency shift key (FSK) demodulator for the remote station.
Figure 6B:
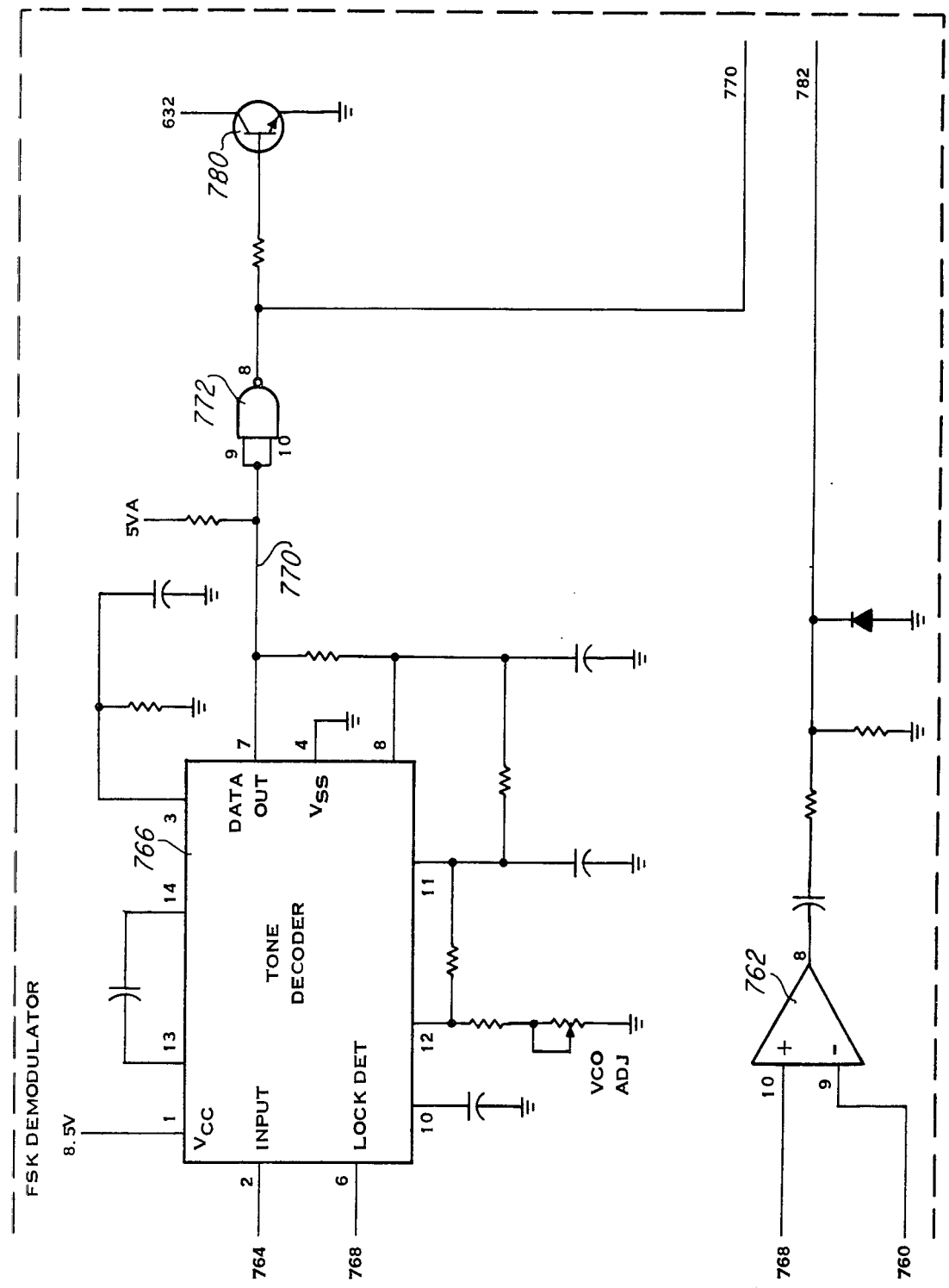

The digital control board 56 (FIG. 3c) is shown schematically in FIGS. 4a-4e in which the data in terminal 506 (FIG. 4a) and transmitter enable terminal 512 are connected, respectively, by terminals 626 and 628 to leads 426 and 414 leading to the Receiver/Synthesizer PWB 146 (FIG. 3d). The DEC out terminal 488 and data out terminal 518 are connected, respectively, by leads 630 and 632 to the code comparator 36 (FIGS. 2a and 7a) and frequency shift key demodulator 34 (FIGS. 2a and 6b). The external audio terminal 500 (FIG. 4a) is connected by lead 634 to the $Y_2$ terminal of analog switch 636 (FIG. 4b) for radio functional control. The external PTT terminal 494 (FIG. 4a) is connected through lead 638 to input terminals of NAND gates 640 and 642 (FIG. 4b). NAND gate 640 has its other input terminal connected to a 5 V source and its inverted output connected to terminal $E_2$ of the analog switch 636. NAND gate 642 has its other input terminal connected to local push-to-talk terminal 188 (FIG. 3d). NAND gate 642 is controlled by either the LOC PTT signal of the microphone PTT switch or by the EXT PTT jack. The inverted output of NAND gate 642 is connected by lead 644 through inverter 646 to input terminals of NOR gates 648 and 649 (FIG. 4c). NAND gate 642, for transmit operation pulls the most significant address line of PROMS 918, 920, and 922 (FIG. 10b) high. NOR gate 648, which is connected through input 652, and NOR gate 649 (FIG. 4c) have their other terminals connected by lead 650 (FIG. 4b) to select PA terminal 194. The public address (PA) mode selection signal is generated by OR gate 649 and depressing the PTT switch. The output of OR gate 648 (FIG. 4c) is connected to one input of OR gate 652. OR gate 652 has its other input terminal connected by lead 654 through inverter 656 (FIG. 4b) to lock loss terminal 394. The lock loss indicator is operated by the lock loss input from the Receiver/Synthesizer board via inverter 656. The output of OR gate 652 (FIG. 4c) is connected through inverter 658 and 660, respectively to T/R terminals 454 and transmit indicate terminal 248, and through NAND gate 662 to receiver power control terminal 242. The T/R line pulls high to turn the transmitter on. The transmit indicator is operated via inverter 660. The lock loss indicate terminal 394 (FIG. 4b) is also connected through lead 654 to lock loss indicate terminal 254 (FIG. 4c). OR gate 649 has its output connected to PA switch terminal 224. The select one watt terminal 236 (FIG. 4b) is connected by lead 664 to the input terminals of NAND gate 666 (FIG. 4c) whose output is connected to the high/low power terminal 464. Transmitting is inhibited if phase lock loss has not been achieved, PA mode has been selected, the microphone PTT switch has not been depressed, or the EXT PTT line has not been pulled low. These conditions are sensed by logic highs on OR gates 648 and 652. The receiver is turned off by Receiver Power Control terminal 242 whenever the transmitter is turned on. The HI/LO power line controls the output power of the transmitter via the inverter NAND gate 666 which is controlled by the front panel PA/1/25 switch.

Figure 7A:
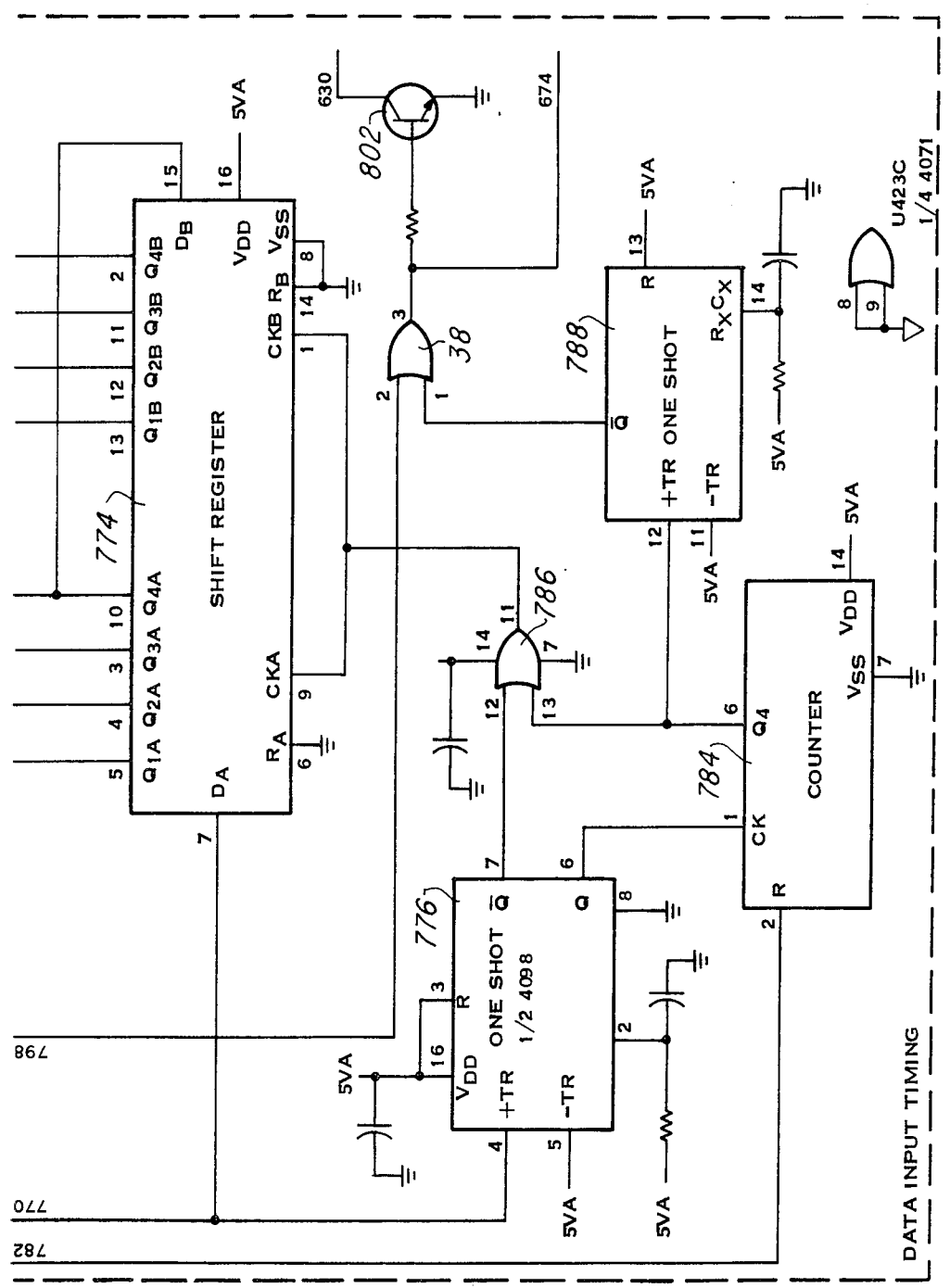
FIGS. 7a–7b are schematic diagrams for the code comparator for the remote station.
Figure 10A:
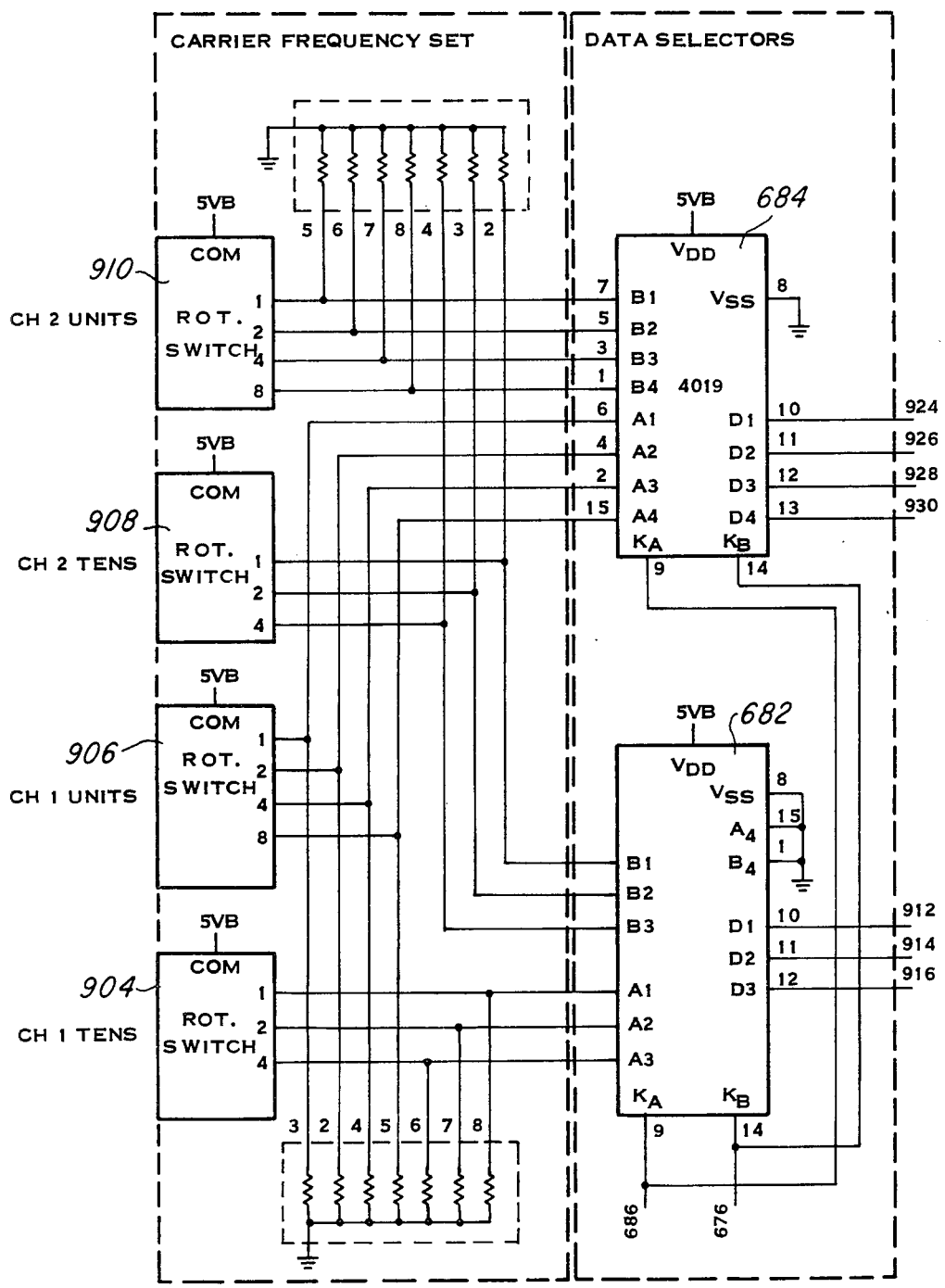
FIGS. 10a–10b are schematic diagrams for the frequency synthesizer's addressing means for the remote station.

The analog switch 636 (FIG. 4b) has its $Z_0$ and $Z_2$ terminals connected by lead 668 to the select microphone audio terminal 206 and its $Y_0$ terminal connected by lead 670 to local microphone audio terminal 176. The local PTT terminal 188 is also connected by lead 672 to auxiliary PTT terminal 406 (FIG. 4a). Switch terminal 430 is connected by lead 674 to the code comparator 36 (FIGS. 2a and 7a). The channel select terminal 200 (FIG. 4b) is connected by lead 676 to a 5 V pull up source of power (FIG. 4b), units B terminal 308, inverter 678 (FIG. 4a) and data selectors 682 and 684 (FIG. 10a) of the synthesizer address means. Inverter 678 is connected by lead 686 to units A terminal 290 and to KA terminals of data selectors 682 and 684 (FIG. 10a). The tens blanker 260, units blanker 314 and +5 V DC 320 terminals are connected to a 5 VA power source and the units C 302, units D 296, tens A 284, tens B 266 tens C 272, and tens D 278 terminals are connected to ground.

A tone squelch generator 688 (FIG. 4d) has a crystal oscillator circuit 690 connected to a CTCSS OSC/counter 692 used as divider (256 or 512). The CTCSS OSC/counter 692 is connected to a CMOS counter 694 which is used as a ÷8 frequency divider to produce the selected tone range (67 Hz to 260 Hz) and whose output is connected by lead 696 through capacitor 698 (FIG. 4e) to potentiometer 700. The adjusted level output of the potentiometer is filtered in low-pass filter 702, amplified in amplifier 704 filtered in filter 706 and outputted at the tone inject terminal 438 for injection into the microphone amplifier input. The receiver audio output is received at terminal 436 (FIG. 4d) filtered in filter 708, and amplified in amplifier 710. The amplified output is connected by lead 711 to CTCSS tone decoder 712 (FIG. 4e) and the decoded output, which if a tone of a preselected frequency is present is a logic low, appears at pin 5 and is applied to one input terminal of NAND gate 714. The other input terminal of NAND gate 714 is connected to NAND gate 716 acting as an inverter to invert the microphone hook signal received at terminal 180. NAND gate 714 has its output connected to diode 718; diode 718 is connected to the tone squelch output terminal 440. This output is such that the tone decoding is used only when the microphone is on its hanger.

Figure 5A:
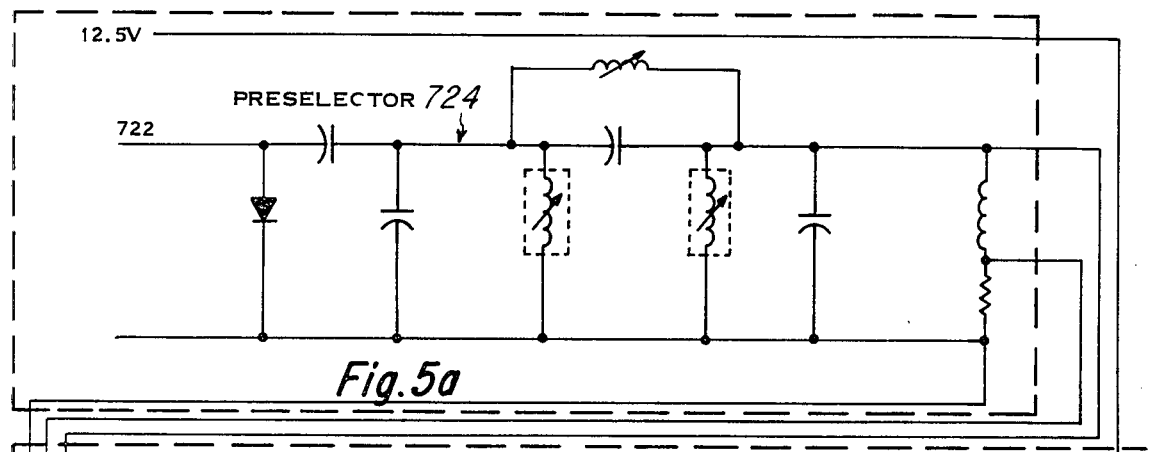
FIGS. 5a–5d are schematic diagrams for the receiver circuits for the remote station.

The receiver 32 of the Receiver/Synthesizer board (FIGS. 5a-5d) has its input terminal 722 (FIG. 5a) connected to antenna 28 (FIG. 2a). A preselector 724 (FIG.

Figure 5B:
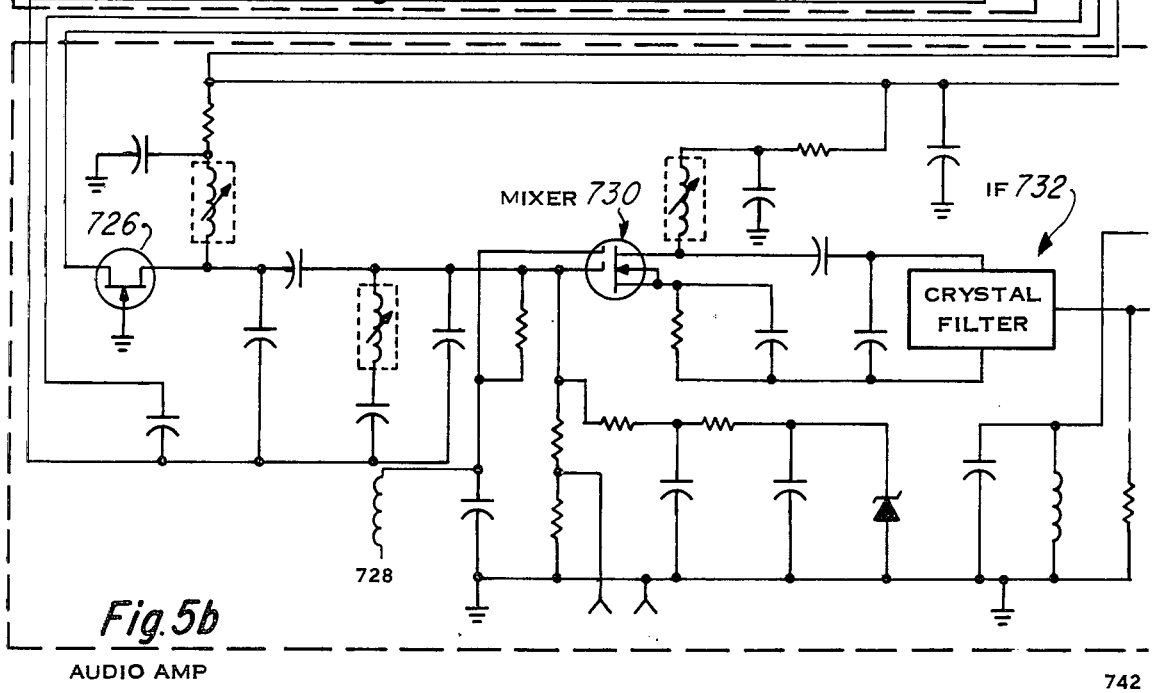
Figure 5C:
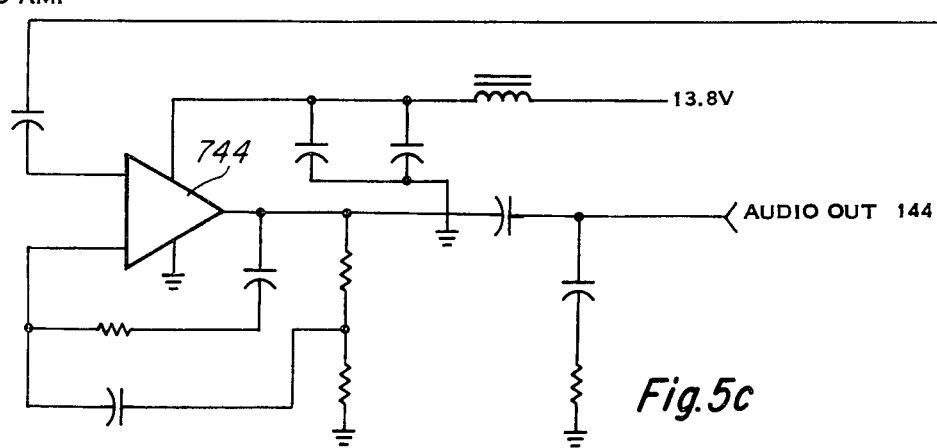
Figure 5D:
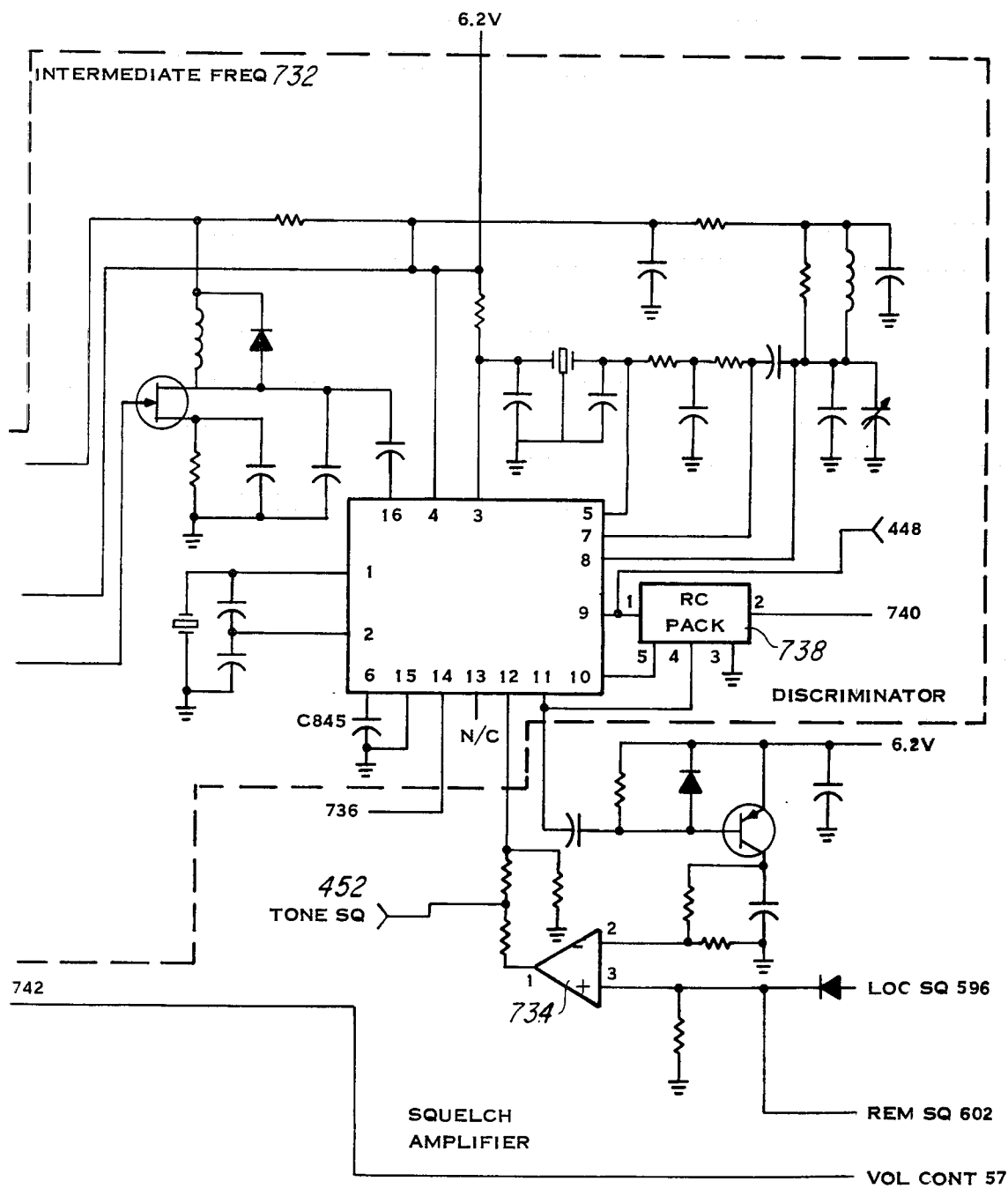
Figure 9A:
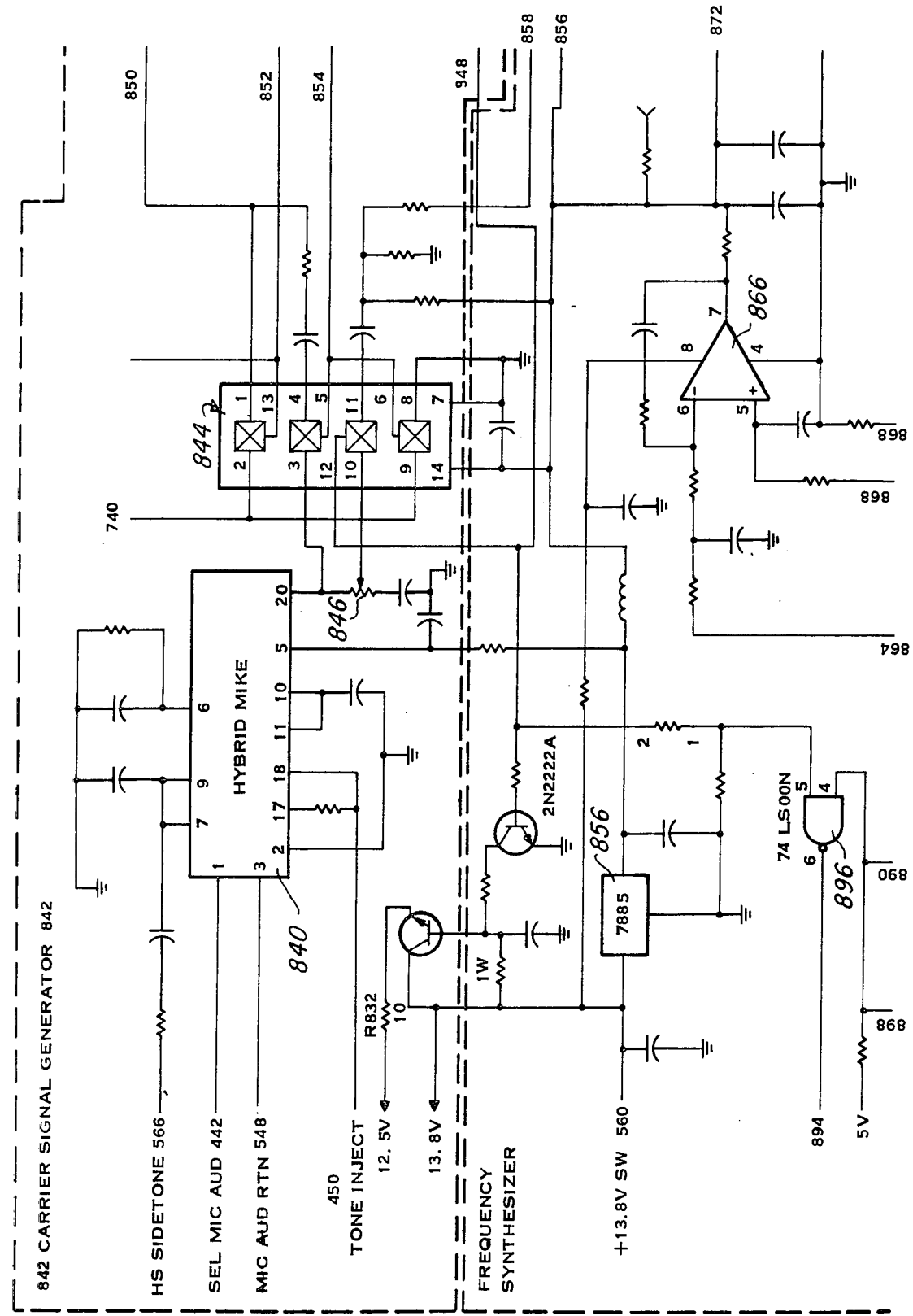
FIGS. 9a–9d are schematic diagrams for the carrier signal generator and frequency synthesizer for the remote station.

5a) is connected to the antenna terminal 722, and a preamplifier 726 (FIG. 5b) is connected to the preselector. A local oscillator signal generated by the frequency synthesizer 24 (FIG. 9b) is connected to terminal 728 for the first mixer 730 (FIG. 5b). The first mixer 730 is connected to an FM IF system 732. The IF system 732 (FIG. 5d) receives the local squelch signal, and remote squelch signal, respectively, from terminals 596 and 602 of the Receiver/Synthesizer PWB which are connected to one input terminal of difference amplifier 734 having its other input terminal connected to IF output pin 11 of the IF system 732. The output of difference amplifier 734 is connected to the junction of tone squelch terminal 452 (FIG. 3c) and pin 12 of the IF system. Terminal 736 (FIG. 5d) connected to PA switch terminal 590 (FIGS. 10b and 10c) is connected to pin 14 of the IF system 732. The output of pin 11 is also connected to a frequency discriminator 738. Pin 9 of the IF system is connected to the discriminator and to the CTCSS audio terminal 448 (FIG. 3c). The output of the discriminator audio is to terminal 740 of the frequency synthesizer analog switch (FIG. 9a). The volume control terminal 578 (FIG. 5d) is connected by lead 742 to audio power amplifier 744 (FIG. 5c) whose output is to audio out terminal 144 (FIG. 3c).

The receiver's audio from the discriminator output 152 (FIG. 3d) is connected to the frequency shift key (FSK) demodulator 34 (FIG. 6a) which comprises a bandpass filter including a differential amplifier 758 having its negative terminal connected to the receiver audio terminal 152 and its positive terminal connected by lead 760 to a 4.25 V reference voltage and the negative terminal of differential amplifier 762 (FIG. 6b). The output of differential amplifier 758 (FIG. 6a) is connected by lead 764 to input pin 2 of tone decoder 766 (FIG. 6b) which changes tones of 1070 Hz and 1270 Hz into logic HIGH and LOW levels, respectively. Tone decoder 766 has its lock detector pin 6 connected by lead 768 to the positive terminal of differential amplifier 762 (FIGS. 6a-6b). The data out pin 7 of tone decoder 766 is connected by lead 770 to the junction of inverter NAND gate 772, data pin 7 of decoder shift register 774 (FIG. 7a) of code comparator 36 (FIG. 2b), and positive TR terminal of one-shot 776 of a data input timing circuit 778 (FIG. 7a).

Figure 7B:
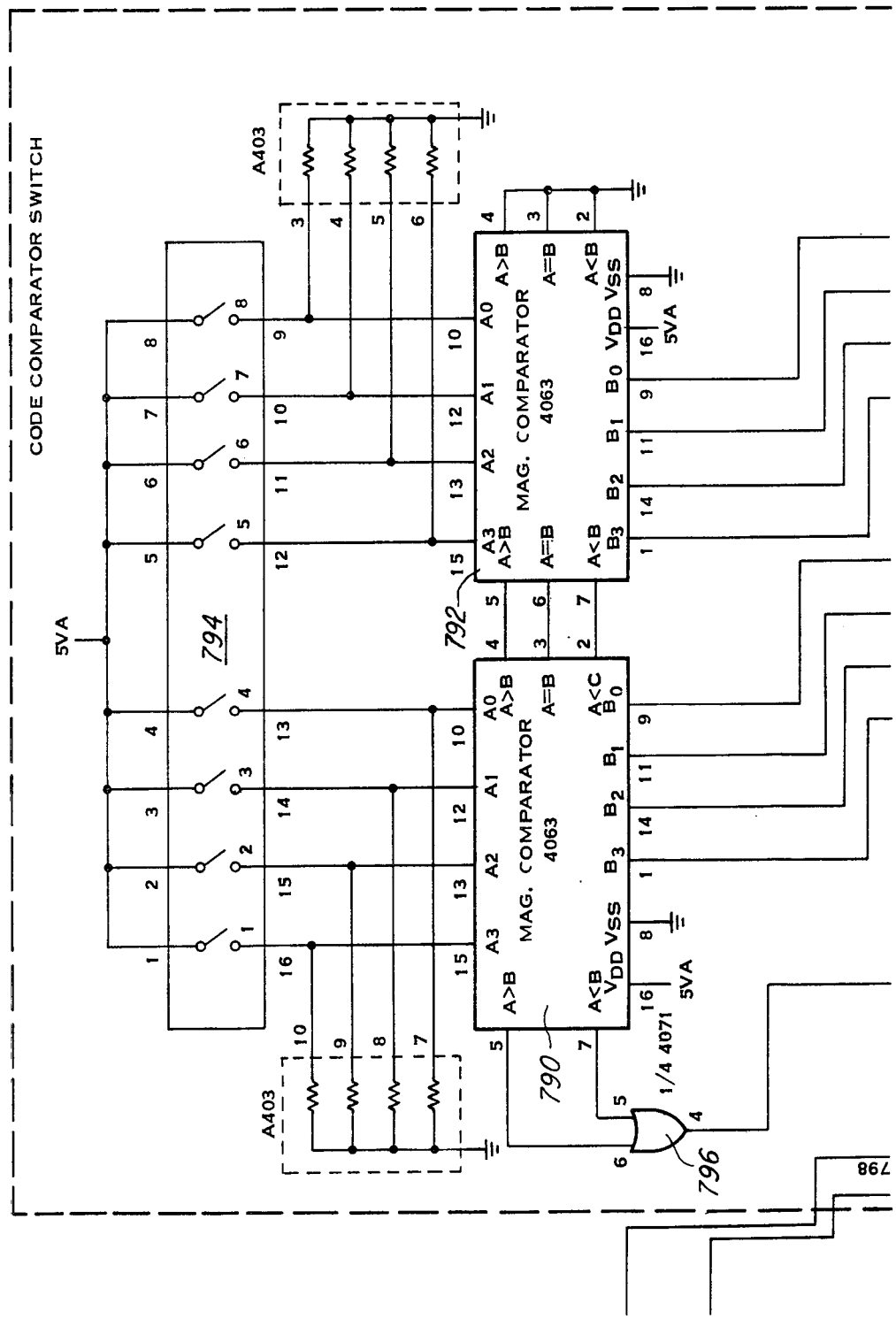

NAND gate 772 (FIG. 6b) which acts as an inverter is connected to the base of transistor 780. Transistor 780 which buffers the demodulated serial BCD output is connected by lead 632 to the data out terminal 518 of the digital control board (FIG. 4a). Difference amplifier 762 (FIG. 6b) has its output connected by lead 782 to reset terminal of counter 784 (FIG. 7a). The decoder is synchronized by the lock detect comparator (differential amplifier) 762 and one-shot 776 is enabled to provide clock pulses. One-shot 776 has its Q pin 6 connected to clock pin 1 of counter 784, and its $\bar{Q}$ pin 7 connected to OR gate 786. OR gate 786 has its other input terminal connected to the Q4 pin 6 of counter 784. The Q output of counter 784 is also connected to the positive TR terminal of one-shot 788. The clock pulse output of OR gate 786, which is the 50% duty cycle time, is connected to the clock A and clock B pins 9 and 1 of shift register 774 of the code comparator 36 (FIG. 2b) and an 8 bit word (carrier identification) is loaded into the shift register. Shift register 774 has its Q1A-Q4A terminals and Q1B-Q4B terminals connected respectively to 4 bit magnitude comparators 790 and 792 (FIG. 7b) which are connected in cascade for comparing the eight parallel outputs representing received carrier identification to the receiver's identification. The receiver identification is set into an 8 position set, 8 bit switch 794 whose outputs are connected to the A0-A4 terminals of the comparators 790 and 792.

The outputs A greater than B (pin 5) and A less than B (pin 7) of comparator 790 are connected to OR gate 796 whose output is connected by lead 798 to OR gate 38 (FIGS. 7a and 2b). The other input to OR gate 38 is connected to the $\bar{Q}$ terminal (pin 9) of one-shot 788 (FIG. 7a). The output of OR gate 38 is connected to the junction of buffer 802 and by lead 674 to the position enable switch terminal 430 (FIGS. 8a, 3d, 4a and 2b) for position enable switch 22 (FIG. 2b). Transistor 802 is connected by lead 630 to the DEC out terminal 488 (FIGS. 4a and 3d) and an open collector logic HIGH is output to the rear panel connector jack.

Figure 8A:
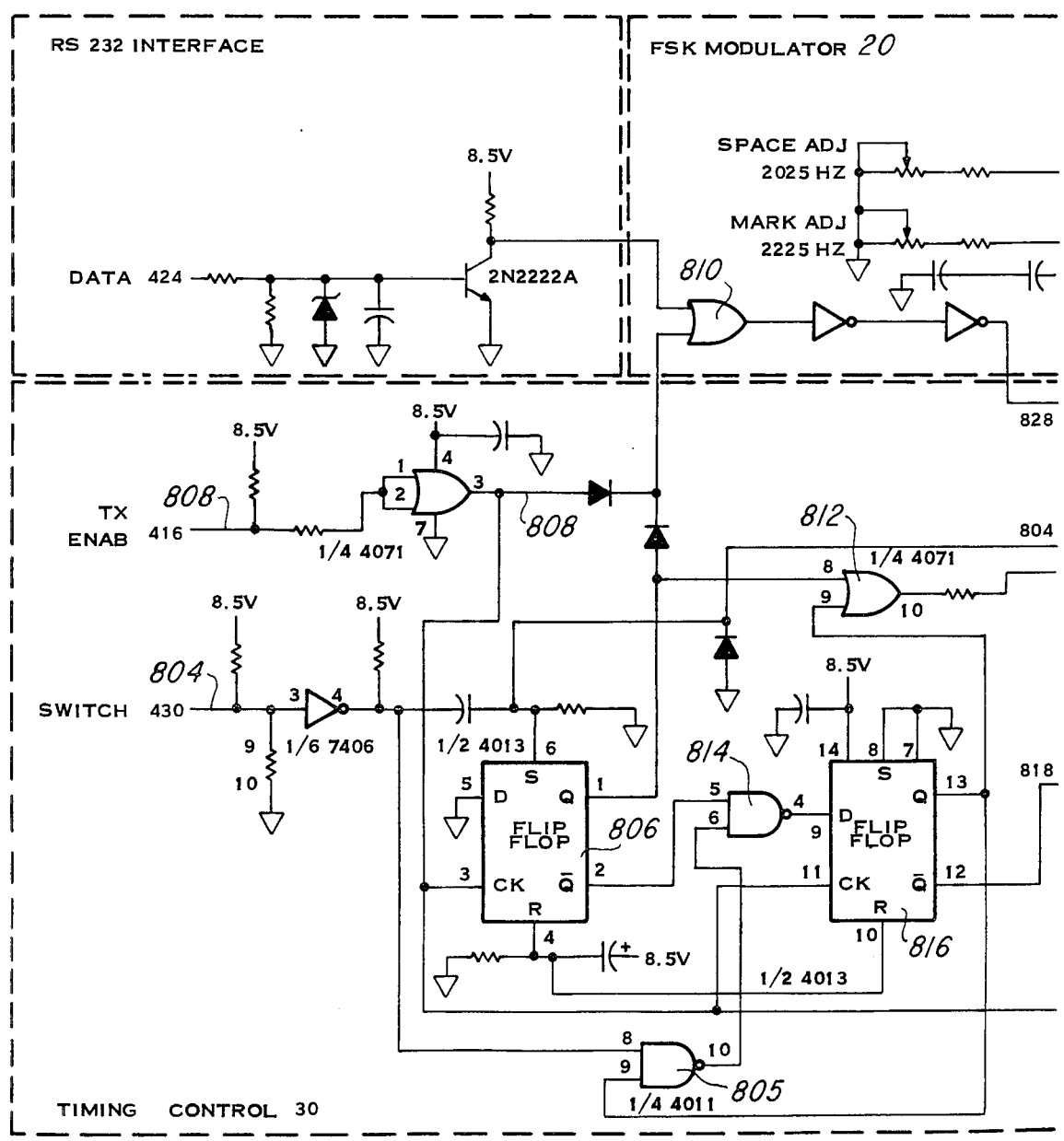
FIGS. 8a–8b are schematic diagrams for the timing and control circuits, RS-232 interface and frequency shift key modulator for the remote station.
Figure 8B:
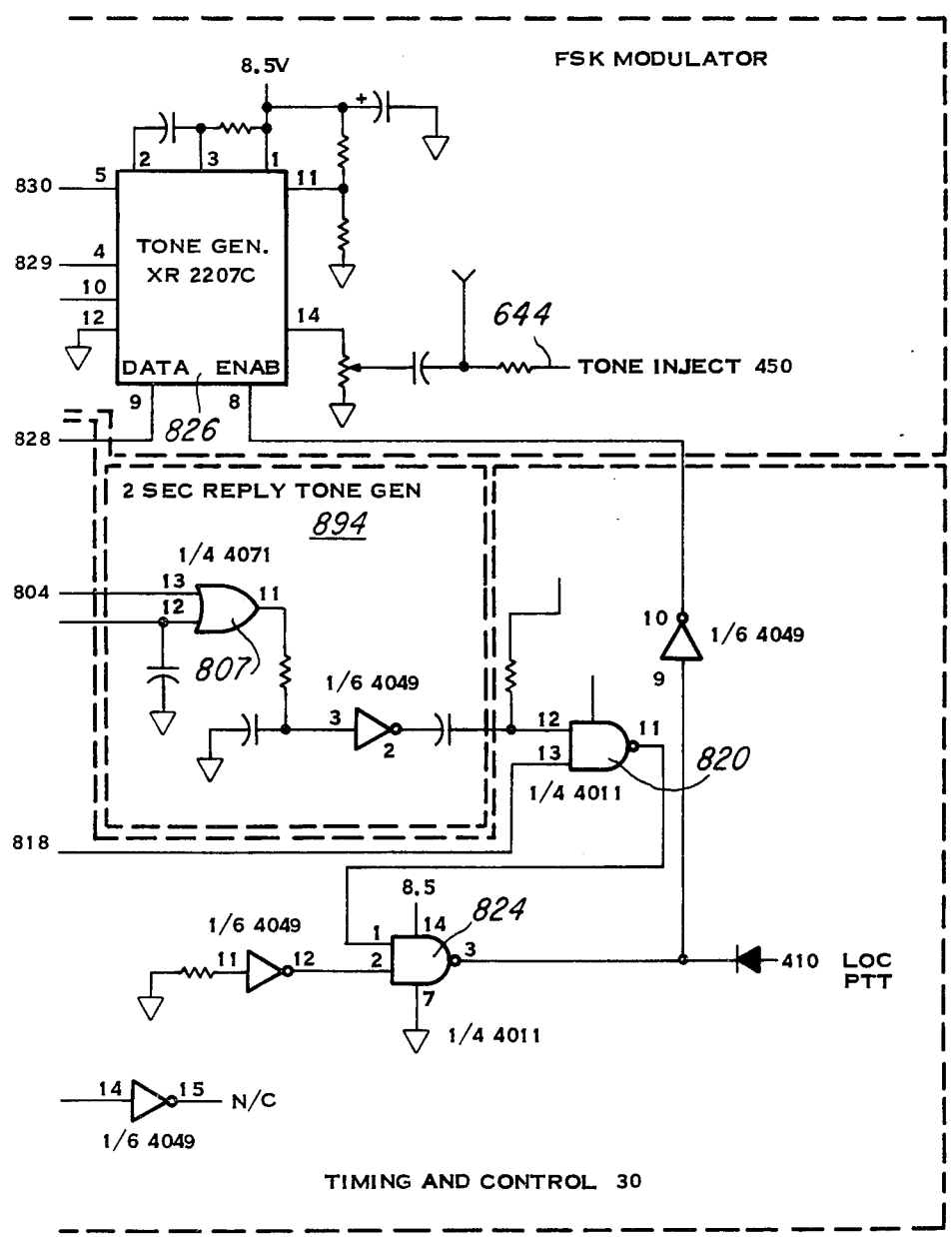

The timing and control circuit 30 (FIG. 2b and 8a) is connected to the position enable switch 22 through position enable switch terminal 430 (FIG. 8a). The terminal 430 is connected by lead 804 to the junction of the set pin 6 of flip flop 806, an input terminal of NAND gate 805 and OR gate 807 (FIG. 8b) of a two second reply tone generator signal circuit 894. The transmit enable terminal 416 (FIG. 3d) is connected by lead 808 (FIG. 8a) to the junction of the clock pin 3 of flip flop 806 and to an input terminal of an OR gate 810 of the frequency shift key modulator 20. The Q and $\bar{Q}$ terminals of the flip flop 806 are connected, respectively, to an OR gate 812 and to a NAND gate 814. NAND gate 814 has its other input terminal connected to the output of NAND gate 805 and its output connected to the data in pin 9 of flip flop 816. The $\bar{Q}$ output of flip flop 816 is connected to input terminals of OR gate 812 and NAND gate 805. NAND gate 805 thus controls NAND gate 814 input to flip flop 816. The Q output of flip flop 816 is connected by lead 818 to NAND gate 820 (FIG. 8b). OR gate 807 has its output connected to the other input of NAND gate 820 whose output is connected to NAND gate 824. The output of NAND gate 824 is connected to the junction of tone generators 826 enable pin 8 of the FSK modulator 20 and local push-to-talk terminal 410 (FIG. 3e).

The tone generator 826 (FIG. 8b) has its data pin 9 connected by lead 828 to the output of OR gate 810 (FIG. 8a) which has its other input terminal connected to the data terminal 424 (FIG. 3d) connected to the microprocessor of a Loran C receiver 12. The Loran C receiver is that sold by Texas Instruments which has a TI 9900 microprocessor. Thus with a transmit enable signal indicating data is available the Loran C receiver outputs its data in the RS-232 code to the data terminal of the tone generator 826. Tone generator 826 has pins 4 and 5 connected by leads 829 and 830 to, respectively, potentiometers (FIG. 8a) which adjust the oscillators internal to tone generator 826 for the 2025 Hz space and 2225 Hz mark tones and an out pin 14 connected by lead 644 to the tone inject terminal 450 (FIG. 3c).

The FSK modulator 20 has its tone inject terminal 450 connected to pins 17 and 18 of the hybrid microphone amplifier 840 (FIG. 9a) of the synthesizer's 24 (FIG. 2b) carrier signal generator 842. Pins 7 and 9, 1, and 3 of the hybrid microphone amplifier are connected, respectively, to the handset sidetone signal terminal 566, select microphone audio terminal 442 and microphone audio return terminals 548 (FIG. 3c). While terminal 5 of the amplifier 840 (FIG. 9a) is connected to the 13.8 V source of power terminal 560 (FIG. 3c). The output pin 20 of amplifier 840 (FIG. 9a) is connected to the junction of pin 3 of analog switch 844 and potentiometer 846 having its arm connected to pin 10 of the analog switch; pins 2 and 9 are connected by lead 740 to the audio output of the receivers discriminator 738 (FIG. 5d); pin 12 is connected by lead 848 to the receiver power control terminal 584 (FIG. 3c); pins 1 and 4 are connected by lead 850 to the high volume control terminal 620 (FIG. 3c); pins 13, 5, and 6 are connected by leads 852 and 854, to PA switch 590 (FIG. 3c); pin 14 is connected to voltage regulator 856 which is connected to the 13.8 V power source terminal 560 (FIG. 3c), and the carrier signal output terminal 11 is connected by lead 858 to varactor 860 (FIG. 9b) of the frequency synthesizer 24.

Figure 9B:
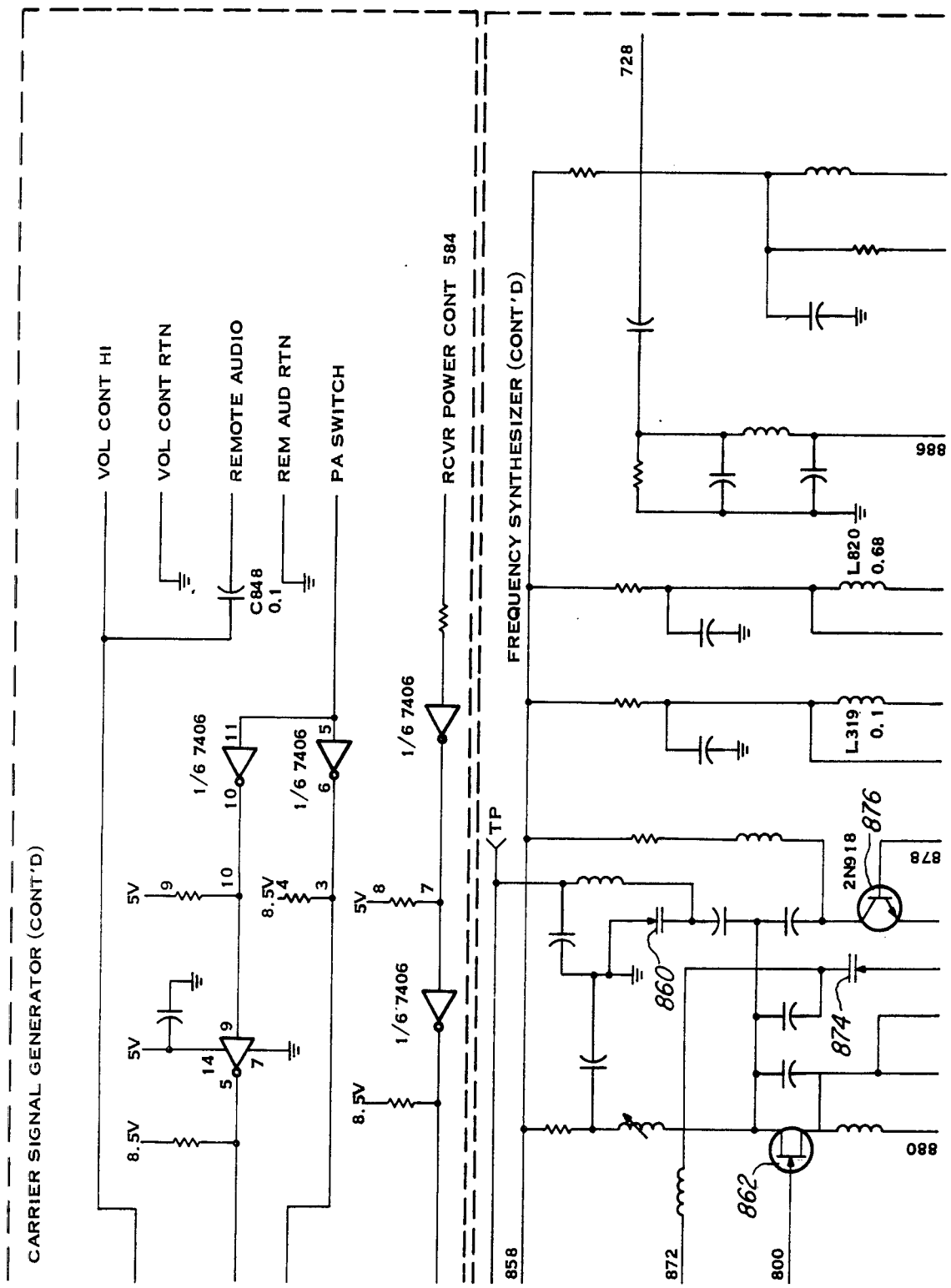
Figure 9C:
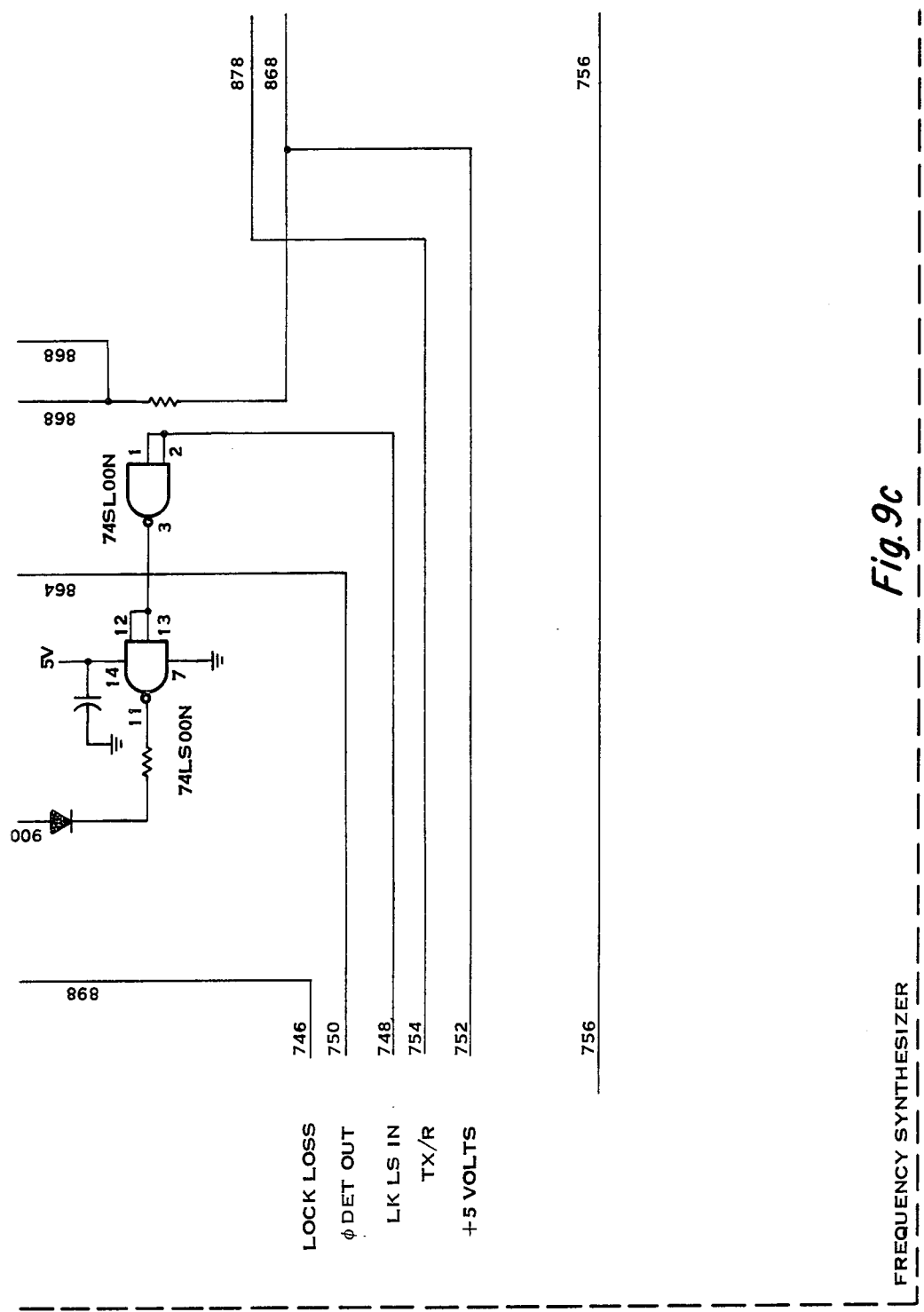
Figure 9D:
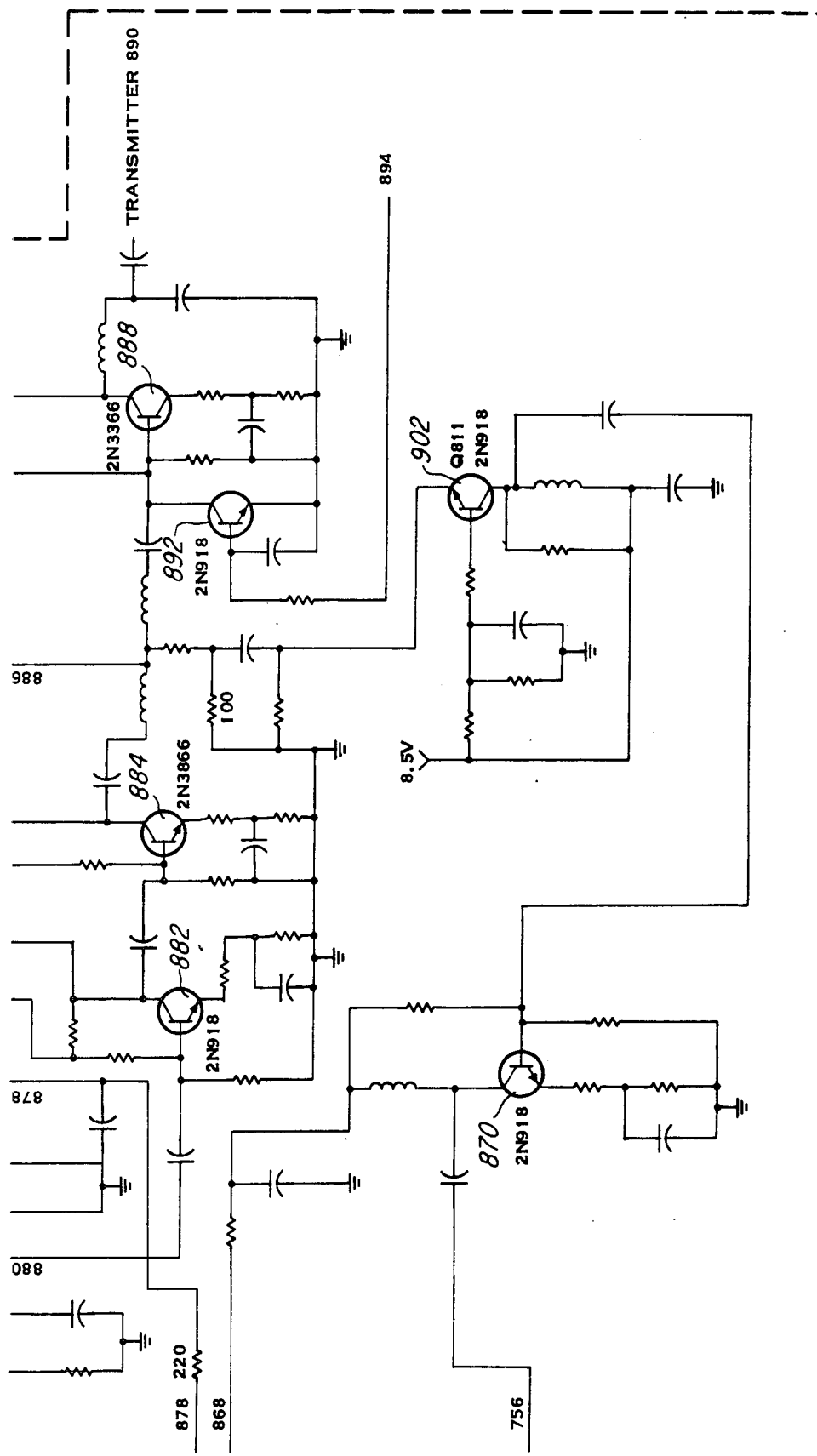
Figure 14A:
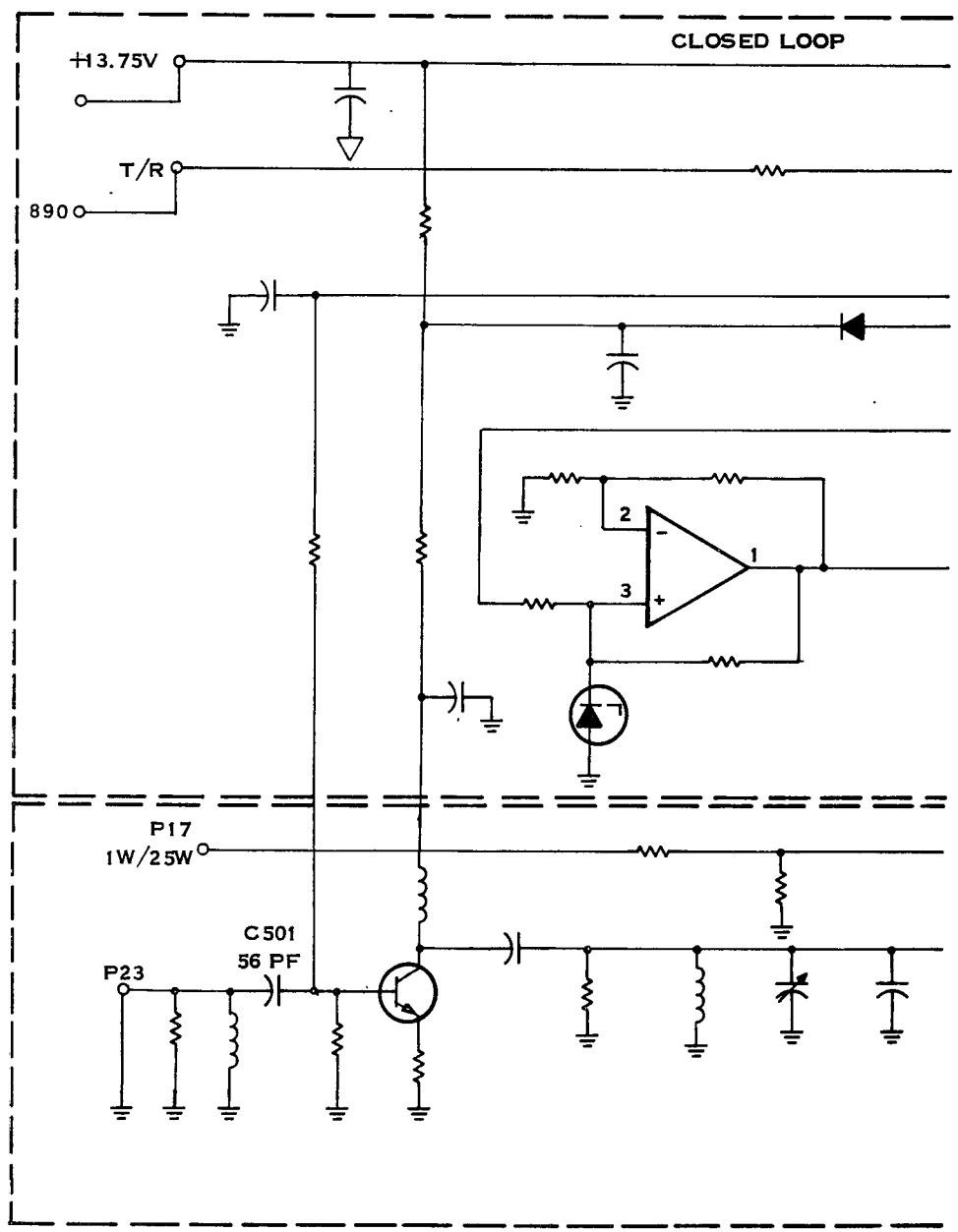
FIGS. 14a–14c are schematic diagrams for the transmitter.
Figure 14B:
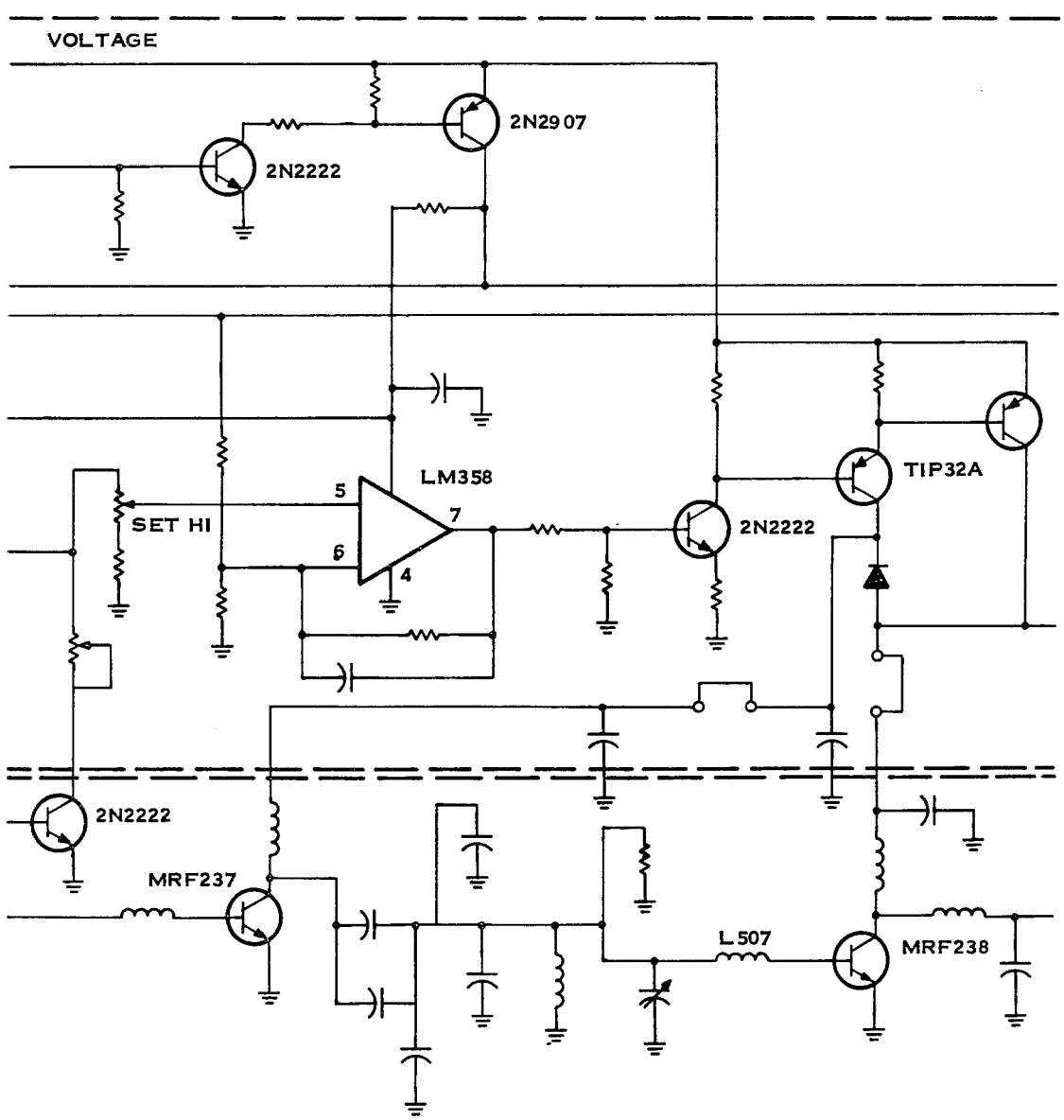
Figure 14C:
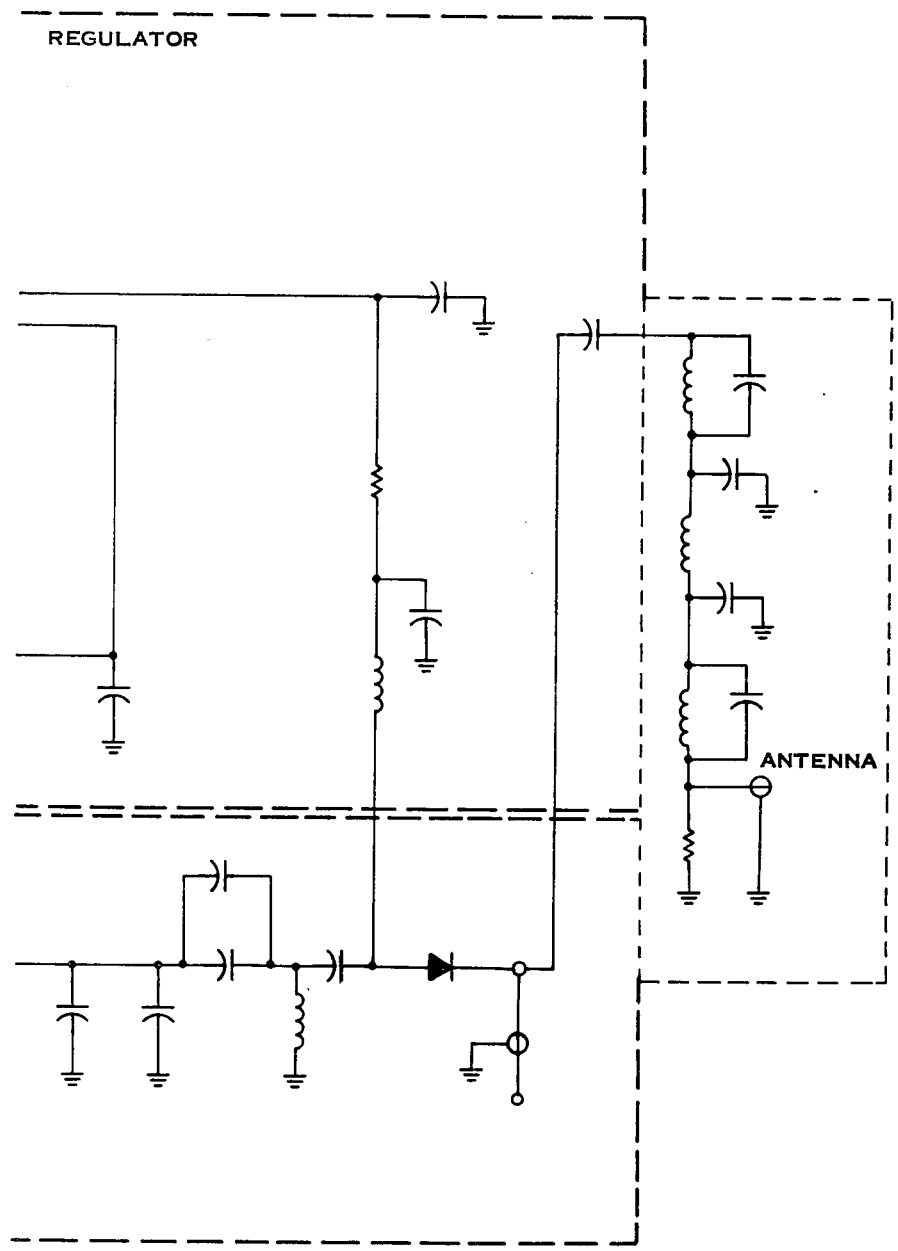

The frequency synthesizer is a direct frequency phase-lock loop that supplies the transmitter power amplifier with 40 mW when in the transmit mode or the first mixer local oscillator of the receiver when in the receive mode. A VCO 862 operates, for example, over the 153.035 MHz to 153.680 MHz frequency range for transmit and 169.935 MHz to 170.580 MHz range for receive operations. A reference oscillator (not shown) is, for example, a stable 10.24 MHz Crystal/CMOS Gate oscillator with CL components for temperature compensation. A phase detector (not shown) utilizes a 5 KHz reference signal which is obtained by dividing the 10.24 MHz reference by 2048 with a ripple counter. The differential output of the phase detector connected to terminal 750 (FIG. 9c) is connected by lead 864 to one input of an operational amplifier 866 (FIG. 9a). The other input of the operational amplifier is connected through a voltage divider by lead 868 to 5 V terminal 752 (FIG. 9d), prescaler terminal 756 and collector of transistor 870 (FIG. 9d). The output of operational amplifier 866 (FIG. 9a) is connected by lead 872 to varactor 874 (FIG. 9b) and to the drain of VCO 862. The varactor 874 tunes the VCO 862 over the synthesizer range. The drain of VCO is also connected to the varactor 860 which receives the carrier signal, and to transistor 876. Varactor 860 is used to produce the FM modulation of the carrier by operating above the synthesizer phase lock loop (PLL) bandwidth of, for example, 20 Hz. While the transistor 876, which is connected by lead 878 to the transmit/receive terminal 754 (FIG. 9c), switches the VCO between the transmit frequency range and the receive frequency range, the VCO 862 transistor (FIG. 9b) and associated circuits form a modified Colpitts VCO whose output is connected by lead 880 to buffering and amplifying transistor 882 (FIG. 9d). Transistor 882 is connected to transistor 884. Transistor 884 is an amplifier/driver stage providing power for the receiver LO injection through lead 886 terminal 728 (FIG. 9b), the feedback loop, and transmitter. The transmit power is connected through a transistor 888 (FIG. 9d) to transmitter input terminal 890. Transmitter contains a three stage RF amplifier (FIGS. 14a-14c) and a dc voltage regulator. The voltage regulator provides the proper supply voltages to the RF amplifier such that the 25 W or 1 W transmit power is delivered to the transceiver. The transistor 888 is controlled by a switching transistor 892 (FIG. 9d) shunting its base to ground when phase lock is lost. Switching transistor 892 (FIG. 9d) is controlled by connecting its base by lead 894 to the output of NAND gate 896 (FIG. 9a). NAND gate 896 has one input connected by leads 898 and 900, respectively, to the lock loss terminal 746 and lock loss input terminal 748 (FIG. 9c), and its other input connected by lead 848 to the receiver power control terminal 584 (FIG. 9b). The PLL feedback loop includes a transistor 902 (FIG. 9d) which derives its feedback from transistor 884 to which it is connected. Transistor 902 acts as a buffer driver to the divider chain. Transistor 902 is connected to transistor 870 which as previously mentioned is the driver for the ECL 10/11 counter which with other counters (not shown) forms the 100/101 variable divider in the PLL feedback loop.

Figure 10B:
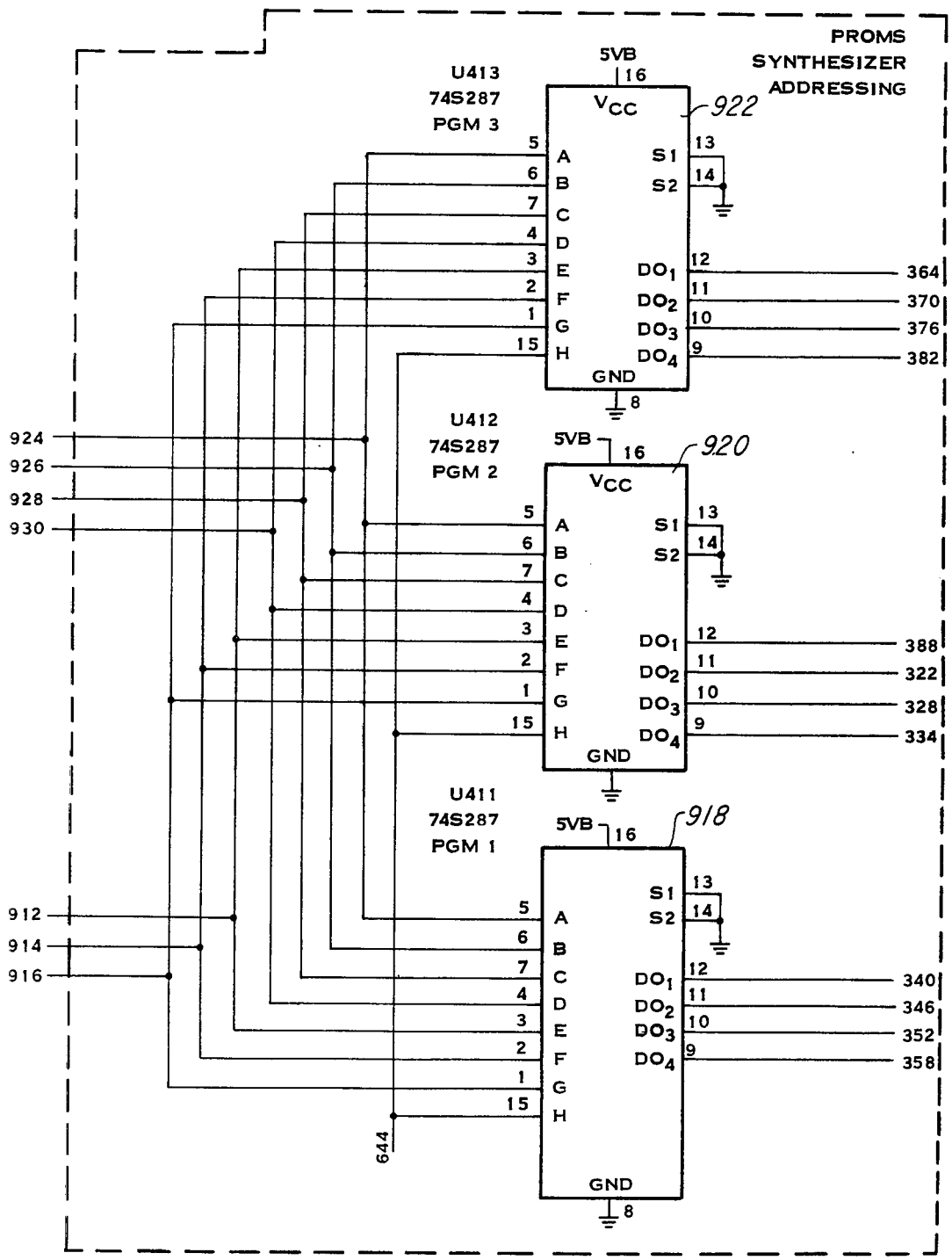

The synthesizer 24 is controlled by a synthesizer address means (FIGS. 10a and 10b). Channel 1 and channel 2 selector includes the switch 96 (FIG. 3b) which is used to select between two predetermined channel frequencies. These two channels are determined by rotating switches 904, 906, 908, and 910 (FIG. 10a). Rotating switches 904 and 906 are for the first selected channels tens and unit numbers and switches 908 and 910 are for the second selected channels tens and unit numbers. The 1, 2, and 4 pin outputs of the tens switches 904 and 908 connected, respectively, to the A1-A3 and B1-B3 terminals of data selector 682, and the 1, 2, 4 and 8 pins of the unit switches 906 and 910 are connectd, rspectively, to the A1-A4 and B1-B4 of data selector 684. The enabling $K_A$ and $K_B$ pins of data selectors 682 and 684 are connected by leads 686 and 676 to the channel select terminal 200 and units A and units B terminals 290 and 308 (FIG. 4a). The output pins D1-D3 of the tens data selector 682 are connected by address leads 912, 914, and 916 to the EFG terminals of PROMS 918, 920, and 922 (FIG. 10b). The D1-D4 pins of data selector 684 (FIG. 10a) are connected by address leads 924, 926, 928 and 930 to the A-D terminals of the PROMS 918, 920 and 922 (FIG. 10b). The H terminals of PROMS 918, 920 and 922 are connected by lead 644 to the local PTT and EXT PTT terminals 188 (FIG. 4b) and 494 (FIG. 4a). The synthesizer address outputs of PROM 918 are to the A8, A16, A32 and A64 terminals 340, 346, 352, and 358 (FIG. 3d); PROM 920 to the A4, A2, A1 and B64 terminals 334, 328, 322 and 388; and PROM 922 to the B32, B4, B2 and B1 terminals 382, 376, 370, 364. Forty-four frequencies have been programmed into the PROMS 918, 920, and 922 and are represented by two digit numbers. The two frequencies selected are obtained by setting the rotary switches 904–910 (FIG. 10a) for the two channels desired. The data selectors determine which switches are being read and are controlled by the front panel CH1/CH2 switch 96. The data selector outputs are to the PROM address lines and the data is then decoded into a synthesizer address at their outputs. The output is controlled by the local PTT signal to obtain transmit frequency addresses.

Figure 11A:
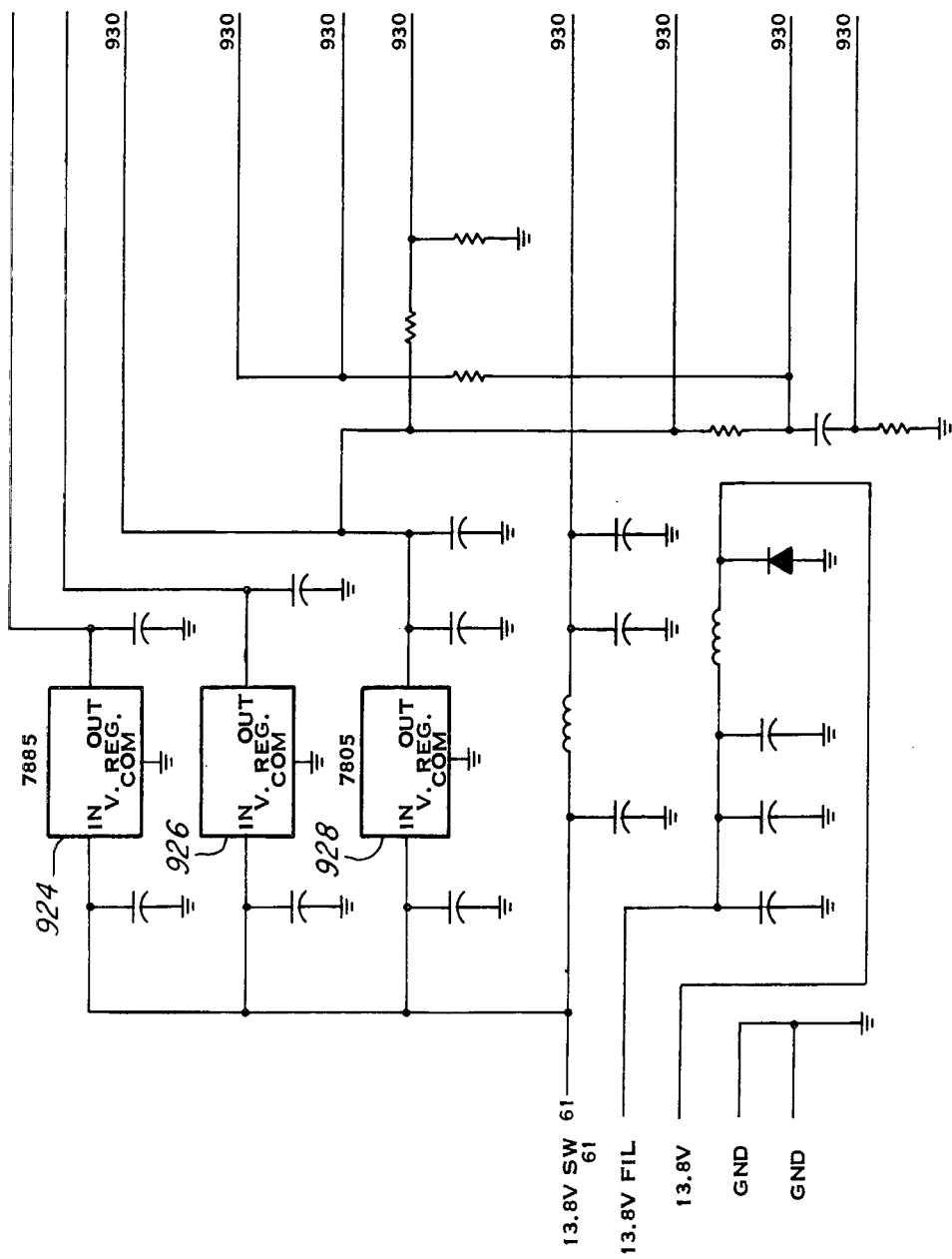
FIGS. 11a–11b are schematics for the power supply for the remote station.
Figure 11B:
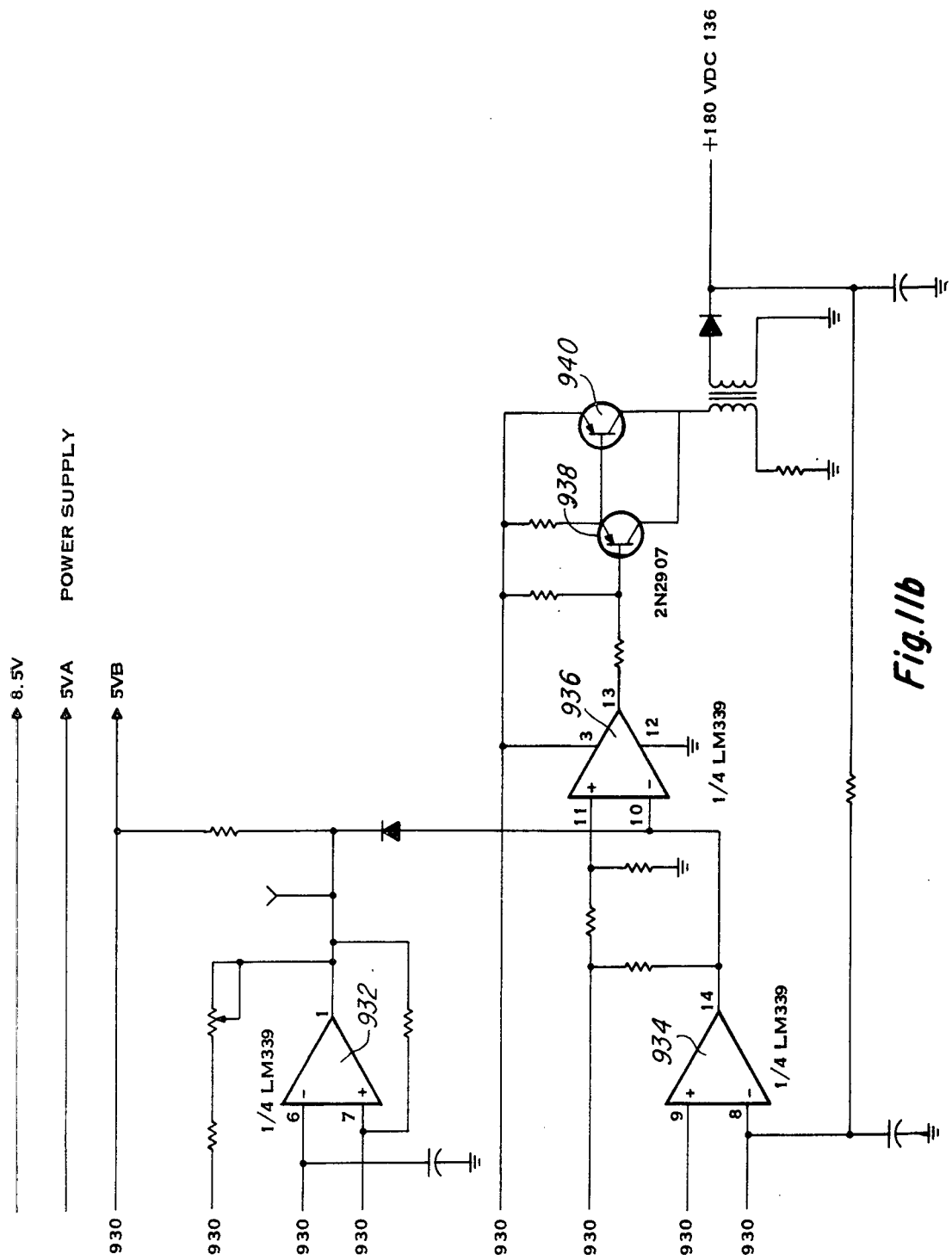

The power supply for the remote station system (FIGS. 11a and 11b) has voltage regulators 924, 926, and 928 connected to the 13.8 V terminal 61 (FIG. 3d). Voltage regulator 926 provides 5 Vdc to the control circuits (other than for the PROMS), the synthesizer, and the data decoding circuit; voltage regulator 928 provides 5 Vdc to the synthesizer addressing data selectors and PROMS and to the 180 V power supply; and voltage regulator 924 provides 8.5 Vdc to the CTCSS circuits and data demodulation circuit. The 180 V power supply which drives the display is a switching type and comprises a line filter, master oscillator and a regulator. The output of voltage regulator 928 is applied to the positive terminals of the master oscillator 932 (FIG. 11b), 180 V comparator 934, and comparator 936. The negative terminal of the master oscillator 932 is connected through dropping resistors to the output of voltage regulator 928 (FIG. 11a). The master oscillator operating, for example, at 29.27 KHz produces a triangular waveform which is summed with a regulated 5 Vdc and connected to the postive terminal of difference amplifier 934 (FIG. 11b). The negative terminal is connected to the 180 V output at terminal 136. The output of difference amplifier 934 which is the error voltage is connected to comparator 936 which inverts and squares up the error voltage. The comparator 936 has its output connected to switching transistors 938 and 940. The output of transistor 940 is connected to a step-up transformer which is driven by the pulsed output of the transistor 940. The transformer is connected to a rectifier 942 and filiter 944 to produce the regulated 180 volts.

Figure 12:
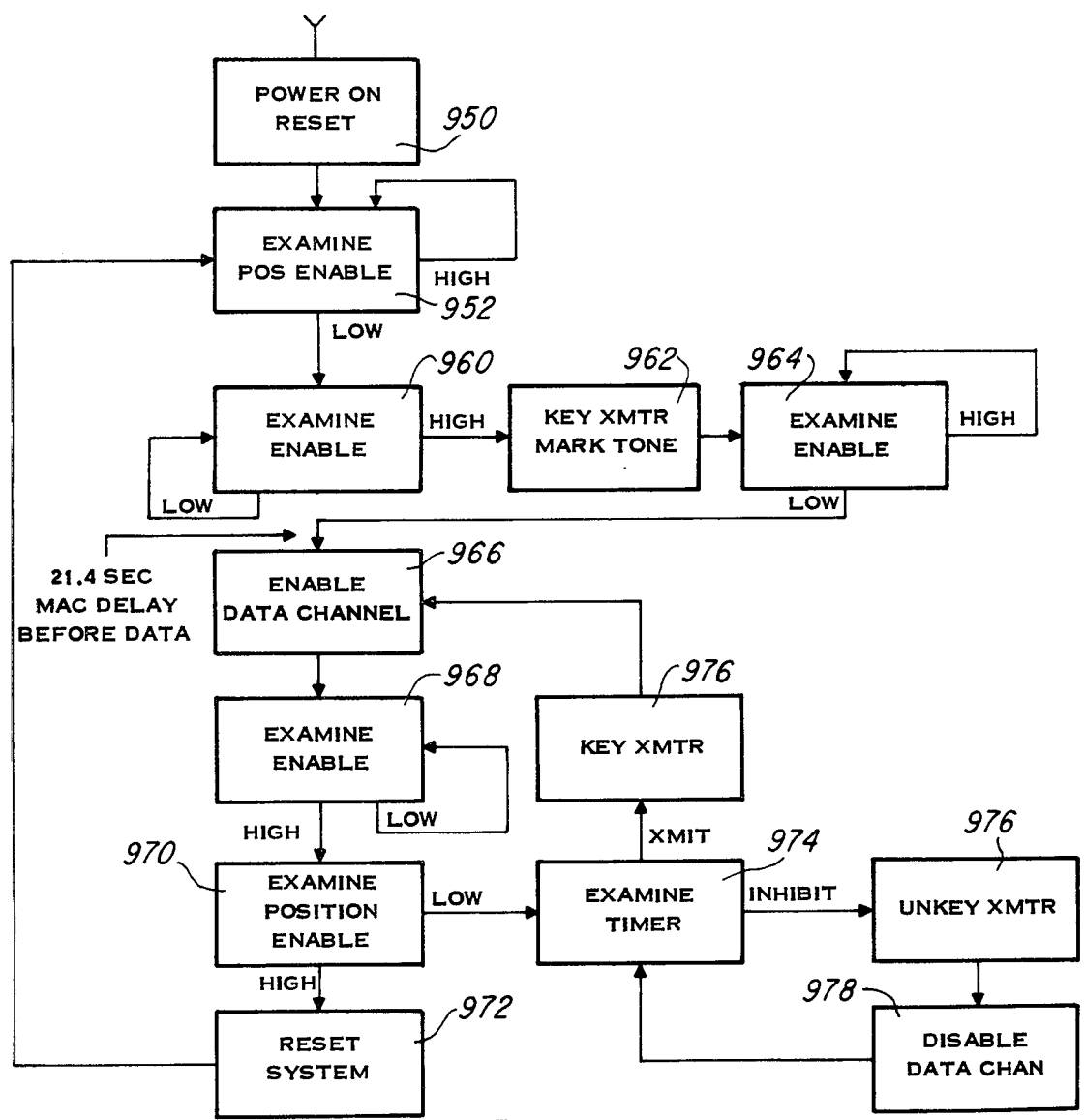
FIG. 12 is a flow diagram for the operation of the remote station.

In the operation of the remote station the digital control board is programmed (FIG. 12) as follows. With power turn on, the whole system is reset 950. Then the position enable switch is monitored 952; if high the switch is monitored until a low is detected. After the two second mark tone, the enable terminal of the Loran C receiver is examined 960 to determine if position information is present on the data bus; if low, examination of the enable terminal continues until a high appears. When the logic high occurs, the remote transmitter keys a mark tone 962 until position data is present on the data bus. When position data is available, the $\overline{\text{ENABLE}}$ line falls 964. The maximum delay time before data is available is 21.4 seconds. When the $\overline{\text{ENABLE}}$ line falls, the binary data is gated 966 into the FSK modulator. Next, the $\overline{\text{ENABLE}}$ line is examined 968 when a high appears the position enable switch is examined 970. If high, the system resets 972 and returns to examine position enable 952; if the enable switch output is low, the timer is examined 974; if inhibited, the transmitter is unkeyed 976 and the data channel disabled 978. The system then returns to the timer examination step 974. If the timer is not inhibited, the system enters the transmit mode and the transmitter is keyed 976. After the key transmitter step 976, the system returns to the enable data channel step 966 and the process continued for continuous operation.

Figure 13A:
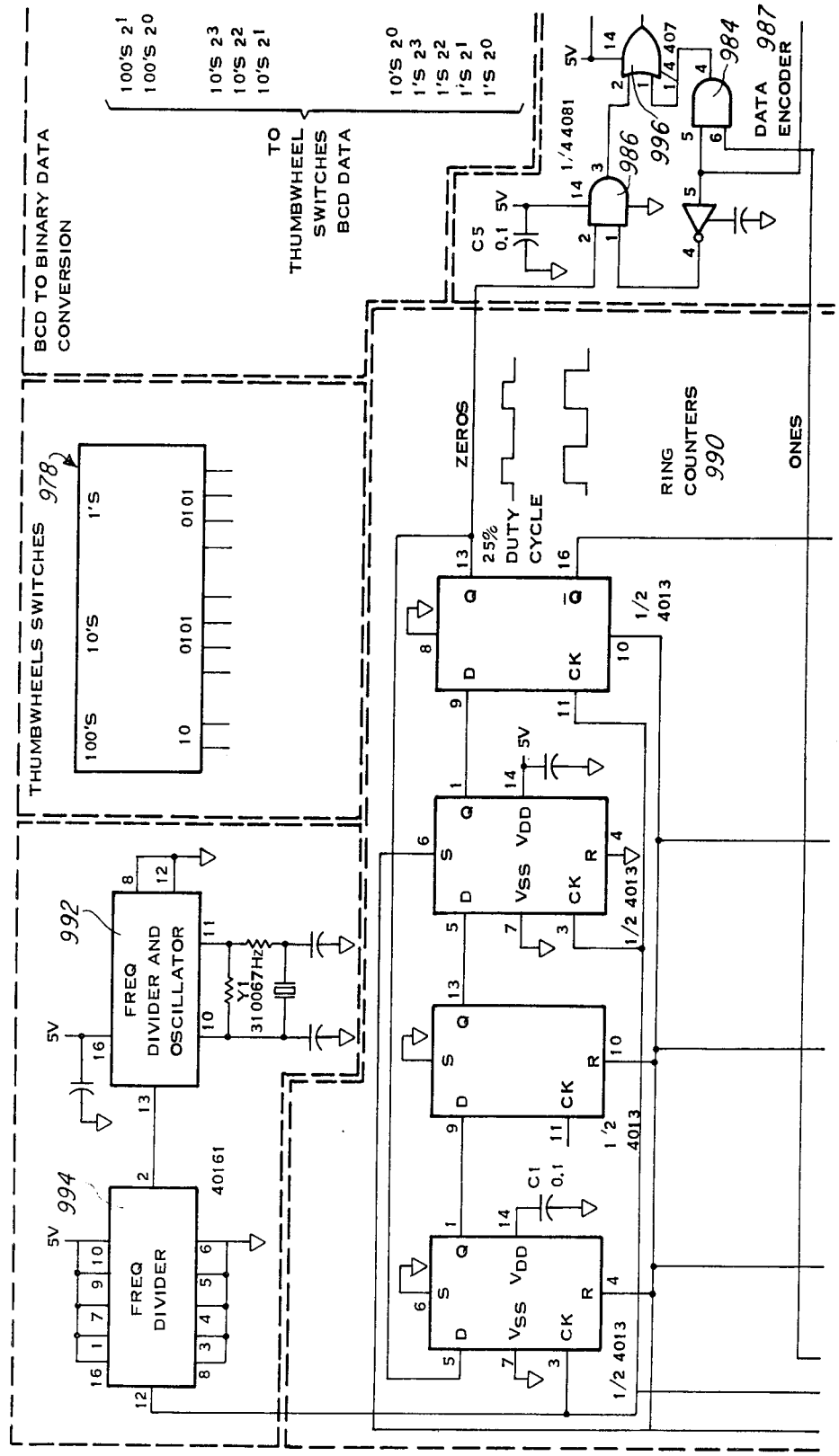
FIGS. 13a–13d are schematic diagrams for the base station.
Figure 13B:
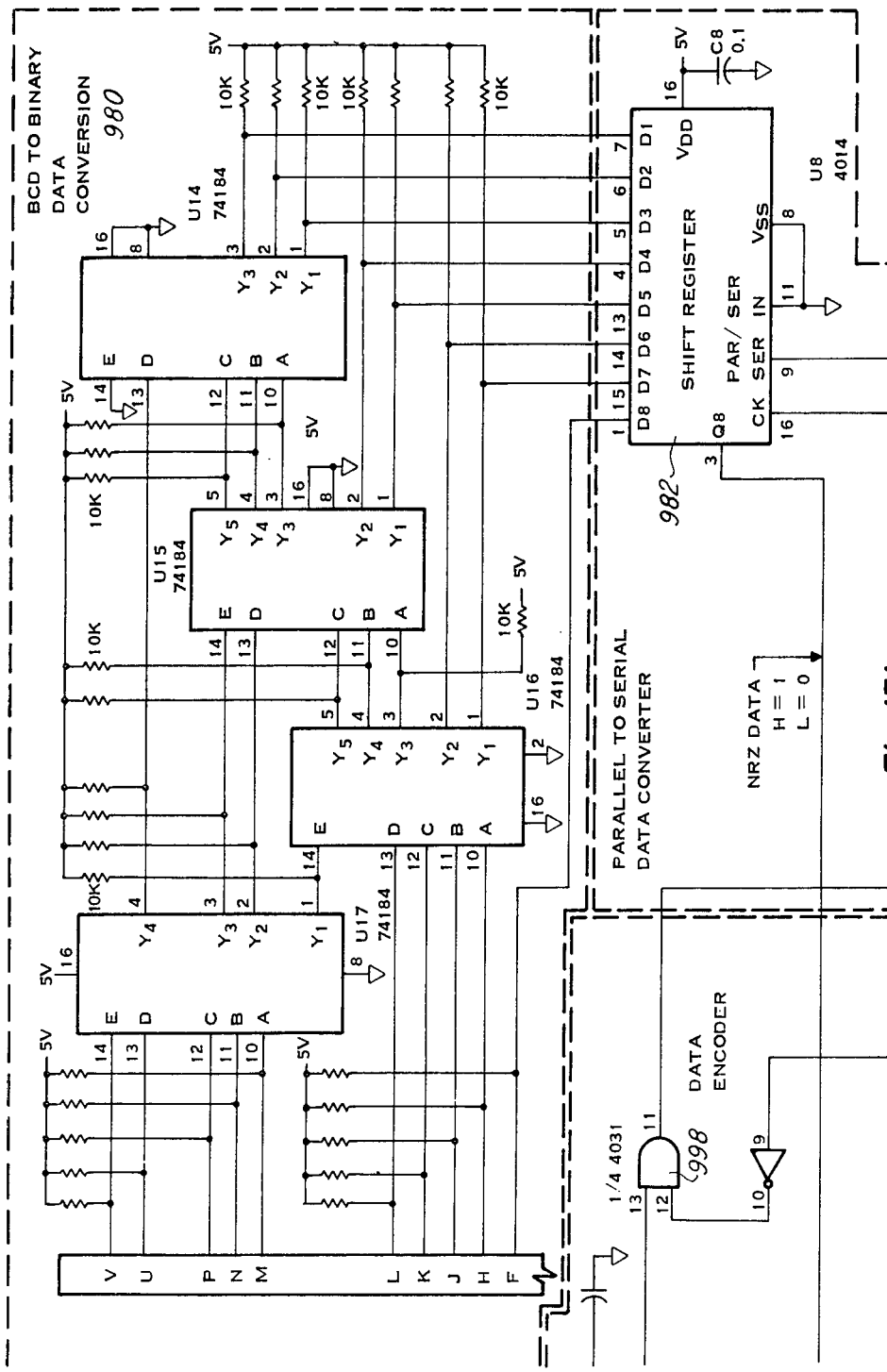
Figure 13C:
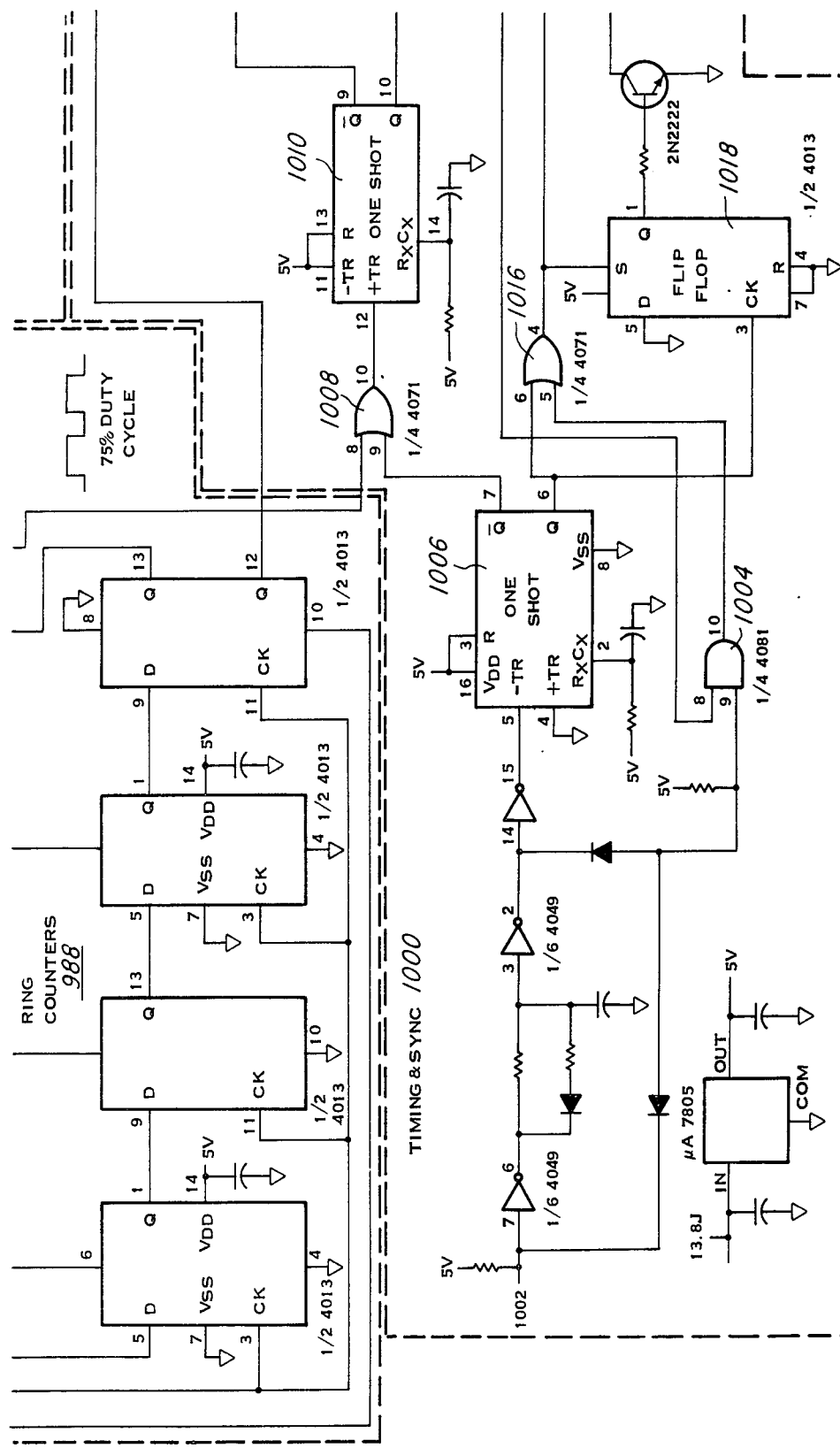
Figure 13D:
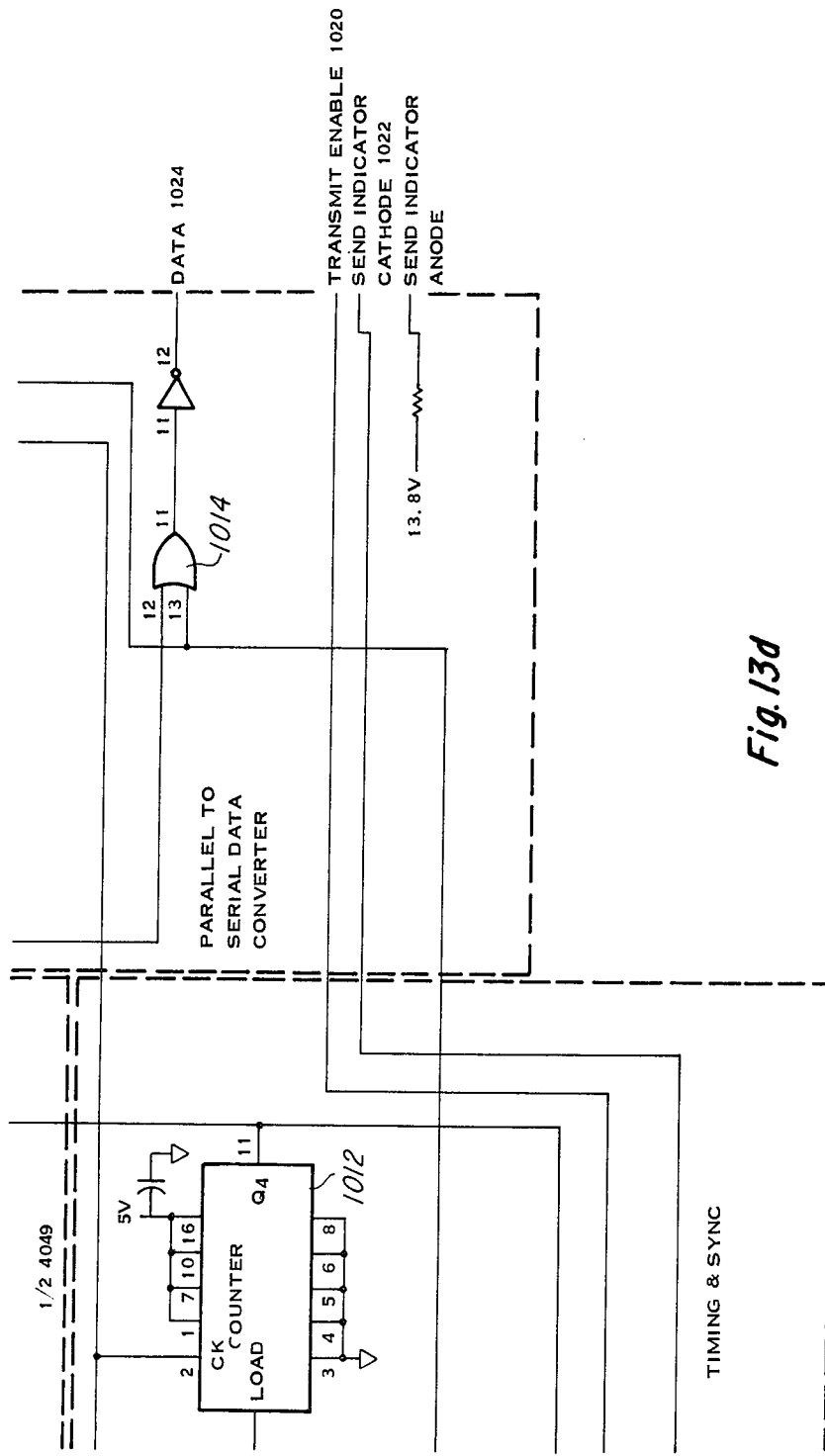

Refer now to FIGS. 13a–13d for a description of the base station polling generator 40 (FIG. 2a). The numerical identification code of the carrier selected to be polled is entered into the system by operator manipulation of thumbwheel switches 978 (FIG. 13a) which provide BCD data to a BCD to binary data converter 980 (FIG. 13b). The binary data is inputted in parallel into shift register 982 and outputted therefrom serially. The Q8 output of the shift register is connected to an input terminal of AND gate 984 (FIG. 13a) and inverted and connected to AND gate 986 of data encoder 987. A ring counter 988 (FIG. 13c) provides a 75% duty cycle output (3 highs and 1 low for every 4 counts). Ring counter 990 (FIG. 13a) provides a 25% duty cycle (1 high and 3 lows for every 4 counts). A crystal controlled oscillator and divider 992 having its output connected to a frequency divider 994 provide a 37.5 Hz frequency to the clocks of the ring counters 990 and 988 (FIG. 13c). Counters 988 and 990 (FIG. 13a) provide ones and zeros, respectively, to the other inputs of AND gates 984 and 986. The outputs of AND gates 984 and 986 are through an OR gate 996 to an input terminal of AND gate 998 (FIG. 13b). A timing and synchronization circuit 1000 (FIG. 13c) is attached to the send switch terminal 1002. The timing and synchronization circuit includes an AND gate 1004 and a one shot multivibrator 1006 having input terminals connected to the switch terminal 1002. The $\overline{Q}$ pin 7 of the one shot multivibrator 1006 is connected to one input of an OR gate 1008 having its other input connected to the $\overline{Q}$ output of ring counter 990 (FIG. 13a) OR gate 1008 (FIG. 13c) has its output connected to a second one shot multivibrator 1010. The $\overline{Q}$ of multivibrator 1010 is connected to the load terminal of counter 1012 (FIG. 13d) whose output Q4 is connected to the other terminal of AND gate 1004 (FIG. 13c), and inverted and connected to the other terminal of AND 998 (FIG. 13b) of the data encoder. The output of AND gate 998 of the encoder is to an input terminal of OR gate 1014 (FIG. 13d). The output of AND gate 1004 (FIG. 13c) is to an OR gate 1016 which has its other input terminal connected to the Q output of one shot multivibrator 1006. The Q output of the multivibrator 1006 is also connected to the clock terminal of flip flop 1018. The output of OR gate 1016 is connected to the set terminal of flip flop 1018 and to the transmit enable terminal 1020 (FIG. 13d). While the Q output of flip flop 1018 (FIG. 13c) is amplified and connected to send indicator cathode terminal 1022 (FIG. 13d).

The Q output of multivibrator 1010 (FIG. 13c) is connected to the other input of OR gate 1014 (FIG. 13d) and to the PAR/SER pin 9 of shift register 980 (FIG. 13b). The output of OR gate 1014 is inverted and connected to the data terminal 1024 leading to the FSK modulator 44 (FIG. 2a).

In operation, the base station and a number of carriers are equipped with radio tranceivers. The base station has a carrier polling generator and the carriers have Loran C (Texas Instruments Loran 9900) navigation systems. The carriers are randomly scattered throughout the area and the base station operator desires to know the position of a particular carrier. This position is obtained by setting the carrier's identification number in the thumbwheel switches of the polling generator. The polling generator produces a serial code for the FSK modulator which tone codes the identification code. The transmitter transmits the tone coded sequence which will activate only the carrier having the same code stored in its radio transceiver. Thus, the transmitted code sequence is received by each carrier and compared with its identification code. The carrier having the same code responds by immediately transmitting a two second tone (mark) which tells the base station that the carrier is active. The carrier then ceases transmission until the position data is available on the Loran 9900 data output bus. The activated carrier then at the beginning of the next display data field transmits a 7 second mark tone which then is followed by the tone coded position message. The base station receiver is synchronized by the mark tones and decodes this position message; the position is printed out on the type printer.

Although several embodiments of this invention have been described herein, it will be apparent to a person skilled in the art that various modifications to the details of construction shown and described may be made without departing from the scope of this invention.

What is claimed is:

1. A communication data link system comprising:
  (a) a base radio transceiver station including a receiver for receiving incoming messages, a polling generator means for generating a carrier identification code signal, a transmitter operatively connected to the polling generator means for transmitting the code signal and a display means for displaying the messages; and (b) a remote radio transceiver for a carrier including a LORAN-C navigation system for outputting signals representative of the carrier's position, a transmitter of the transceiver connected to the navigation system output for transmitting the carrier position signals, a receiver means for receiving the carrier identification code signal transmitted by the base radio transceiver station and a switching means for controlling selectively the automatic and manual transmittal of the carrier position whereby the carrier position may be transmitted in response to receipt of the carrier identification code signal or to manual actuation of the switching means for single transmission or continuous transmission.

2. A communication data link system according to claim 1 wherein the switching means of the remote radio transceiver comprises a logic circuit and a manually operable switch said logic circuit including means operably connected to the manually operable switch and receiver and operative in response to signals from either the manually operable switch or receiver means to activate the carrier position transmitter.

3. A communication data link system according to claim 2 wherein the means of the logic circuit operably connected to manually operable switch and receiver means is an "OR" gate.

4. A communication data link system according to claim 2 wherein the switching means further includes a timing and control means operative in response to the manually operable switch to activate the transmitter for transmitting the carrier position on a preselected basis and in response to the received carrier identification code signal to actuate the transmitter for transmitting the carrier position.

* * * * *